(12) United States Patent
Utsumi et al.

(10) Patent No.: US 7,165,267 B1
(45) Date of Patent: Jan. 16, 2007

(54) STORING APPARATUS AND PASSWORD CONTROL METHOD

(75) Inventors: Kenichi Utsumi, Kawasaki (JP); Yoshiaki Uchida, Kawasaki (JP); Hiroyuki Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/159,833

(22) Filed: Sep. 24, 1998

(30) Foreign Application Priority Data

Mar. 16, 1998 (JP) ................................. 10-065281

(51) Int. Cl.
*G06F 11/30* (2006.01)
*G06F 15/16* (2006.01)

(52) U.S. Cl. .............................. 726/2; 709/229; 726/3; 726/5

(58) Field of Classification Search ................ 713/202, 713/200, 201; 709/223–226, 229; 726/2, 726/3, 5

See application file for complete search history.

(56) References Cited

U.S. PATENT DOCUMENTS

| | | | |
|---|---|---|---|
| 5,027,396 A | * | 6/1991 | Platteter et al. |
| 5,375,243 A | * | 12/1994 | Parzych et al. |
| 5,533,125 A | * | 7/1996 | Bensimon et al. |
| 5,774,650 A | * | 6/1998 | Chapman et al. |
| 5,944,825 A | * | 8/1999 | Bellemore et al. ........... 713/202 |
| 6,055,637 A | * | 4/2000 | Hudson et al. |
| 6,108,791 A | * | 8/2000 | Lee et al. |
| 6,128,742 A | * | 10/2000 | Felt .............................. 713/202 |
| 6,240,184 B1 | * | 5/2001 | Huynh et al. ................ 380/206 |

FOREIGN PATENT DOCUMENTS

| | | |
|---|---|---|
| EP | 770 997 | 5/1997 |
| JP | 629471 | 1/1987 |
| JP | 6337456 | 2/1988 |
| JP | 6362446 | 3/1988 |
| JP | 63201862 | 8/1988 |
| JP | 3 262 067 | 11/1991 |
| JP | 4163649 | 6/1992 |
| JP | 06236325 | 8/1994 |
| JP | 09205512 | 8/1997 |
| WO | 95/14265 | 5/1995 |

OTHER PUBLICATIONS

Rupp Corporation Announces Upgrade to FastLock, May 2, 1990, p. 1-2.*
Newest Version of V_Go Universal Password, Jun. 29, 1999, Pr Newswire, p. 1-2.*

(Continued)

*Primary Examiner*—Ayaz Sheikh
*Assistant Examiner*—Jenise Jackson
(74) *Attorney, Agent, or Firm*—Greer, Burns & Crain, Ltd.

(57) ABSTRACT

A drive preserves a default input password. When there is no password input from the user, the default input password is regarded as a user input password and is compared and collated with a password for access protection, thereby controlling the access protection. In this instance, if the default input password and the password for access protection have the same value, a collation coincidence is obtained. The drive permits the access without needing a password input of the user.

18 Claims, 25 Drawing Sheets

OTHER PUBLICATIONS

IBM's Global Sign-On Eases Log-IN, Aug. 25, 1997, vol. 14, p. 89.*
PC-Lock: Block Unauthorized Access To Your PC With This Software Lock, Jun. 23, 1987, vol. 6, p. 293-294.*
Rosch, Nov. 1992, PC Sources, v3, n11, p476.*
Anderson, Oct. 27, 1992, PC Magazine, v11, n18, p298.*
Rigney, Apr. 14, 1992, PC Magazine, v11, n7, p321.*

* cited by examiner

F I G. 5

| MODE | ACCESS CONTENTS |
|---|---|
| WRITING/READING MODE | NORMAL READ COMMAND AND WRITE COMMAND ARE ACCEPTED. CHANGE OF EACH PASSWORD OF DEFAULT INPUT, READING, AND READING/WRITING IS PERMITTED. |
| READ ONLY MODE | ONLY NORMAL READ COMMAND IS ACCEPTED. CHANGE OF EACH PASSWORD OF DEFAULT INPUT, READING, AND READING/WRITING IS PERMITTED. |
| SECURITY MODE | ACCESS IS INHIBITED. ONLY READ COMMAND OR WRITE COMMAND ASSOCIATED WITH PASSWORD INPUT IS ACCEPTED. |

F I G. 6

| PRESERVING MODE | DEFAULT INPUT PASSWORD STORING POSITION | PASSWORD STORING POSITION |
|---|---|---|
| 1 | DRIVE | DRIVE |
| 2 | MEDIUM | MEDIUM |
| 3 | DRIVE | MEDIUM |
| 4 | MEDIUM | DRIVE |

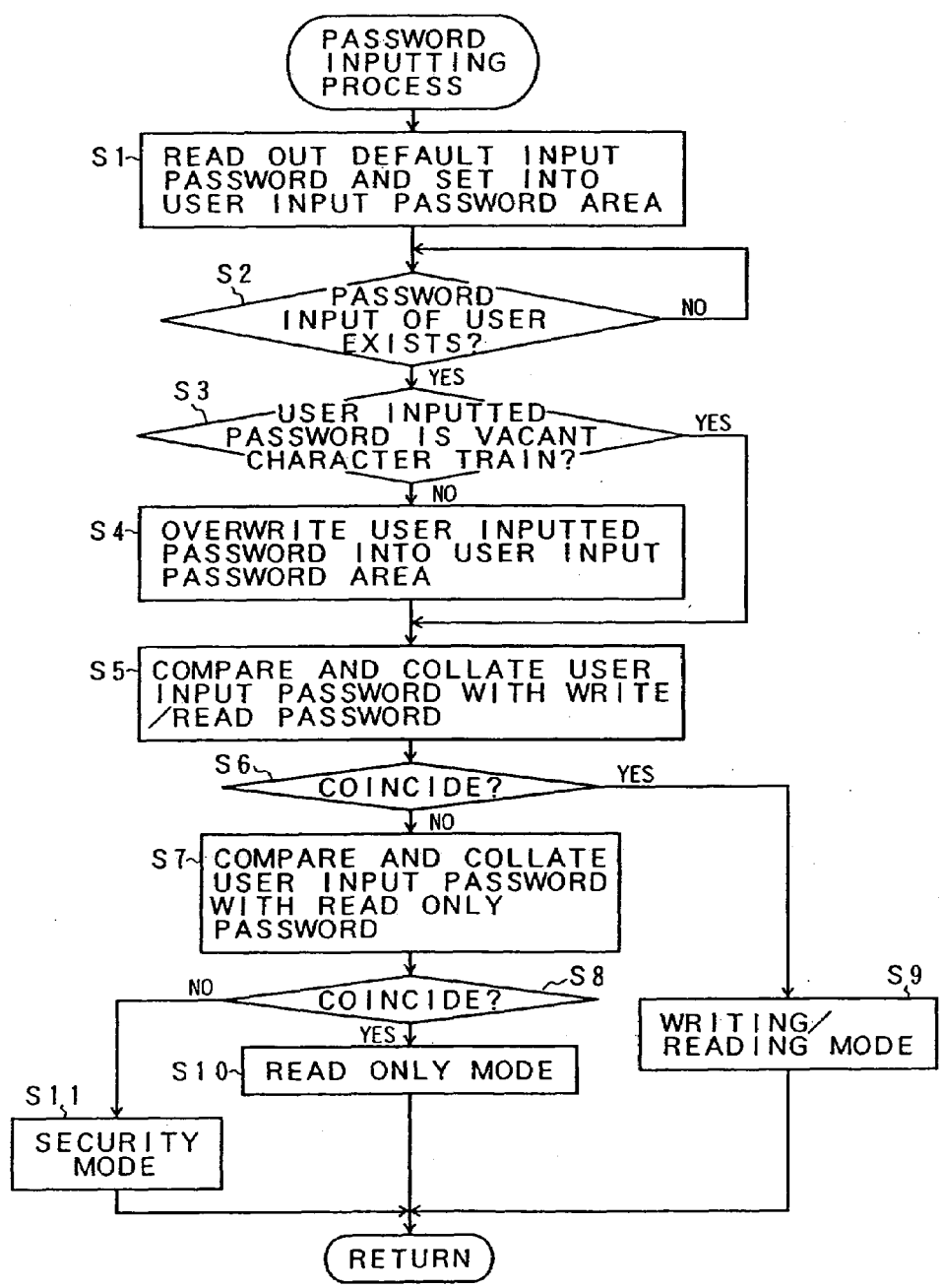

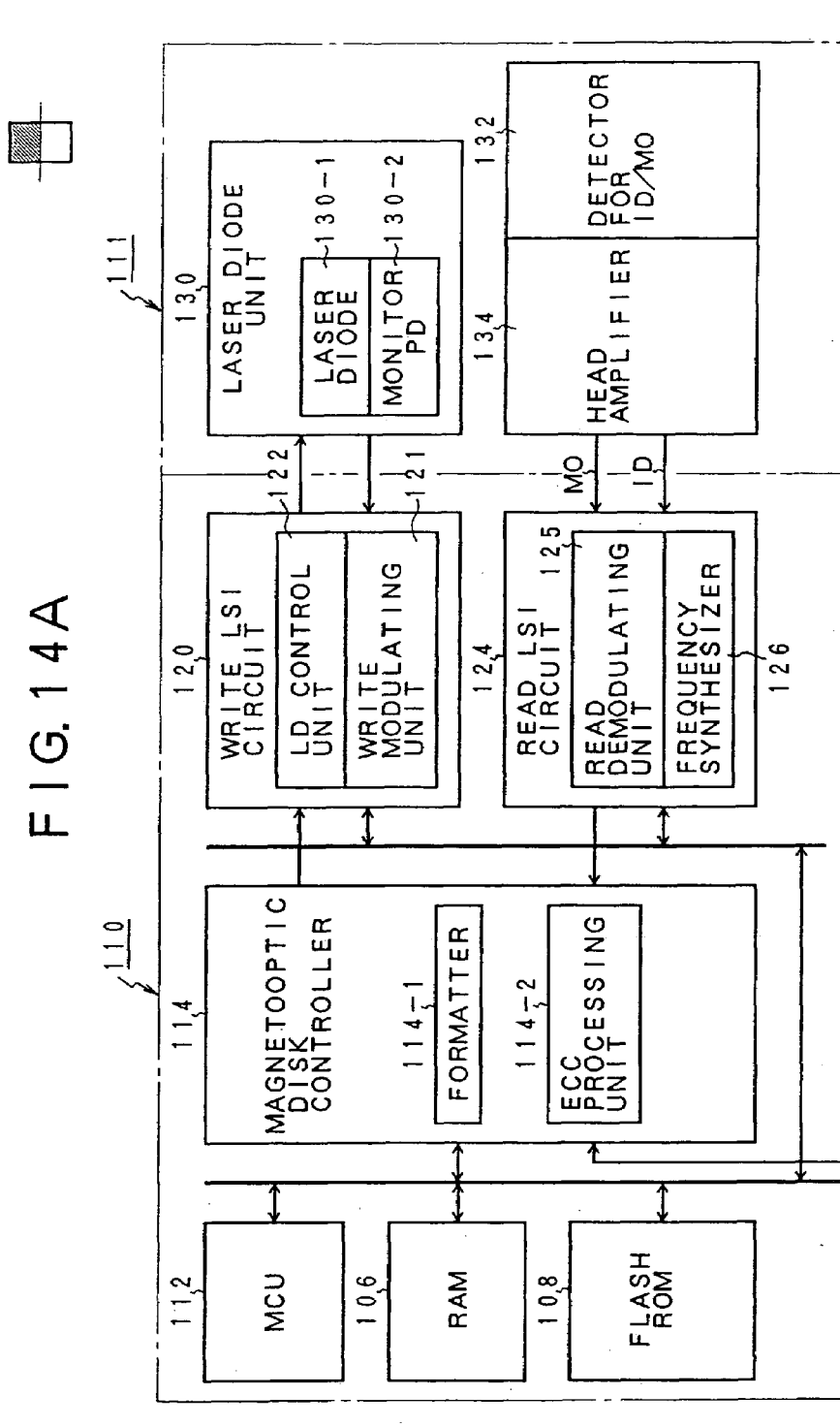

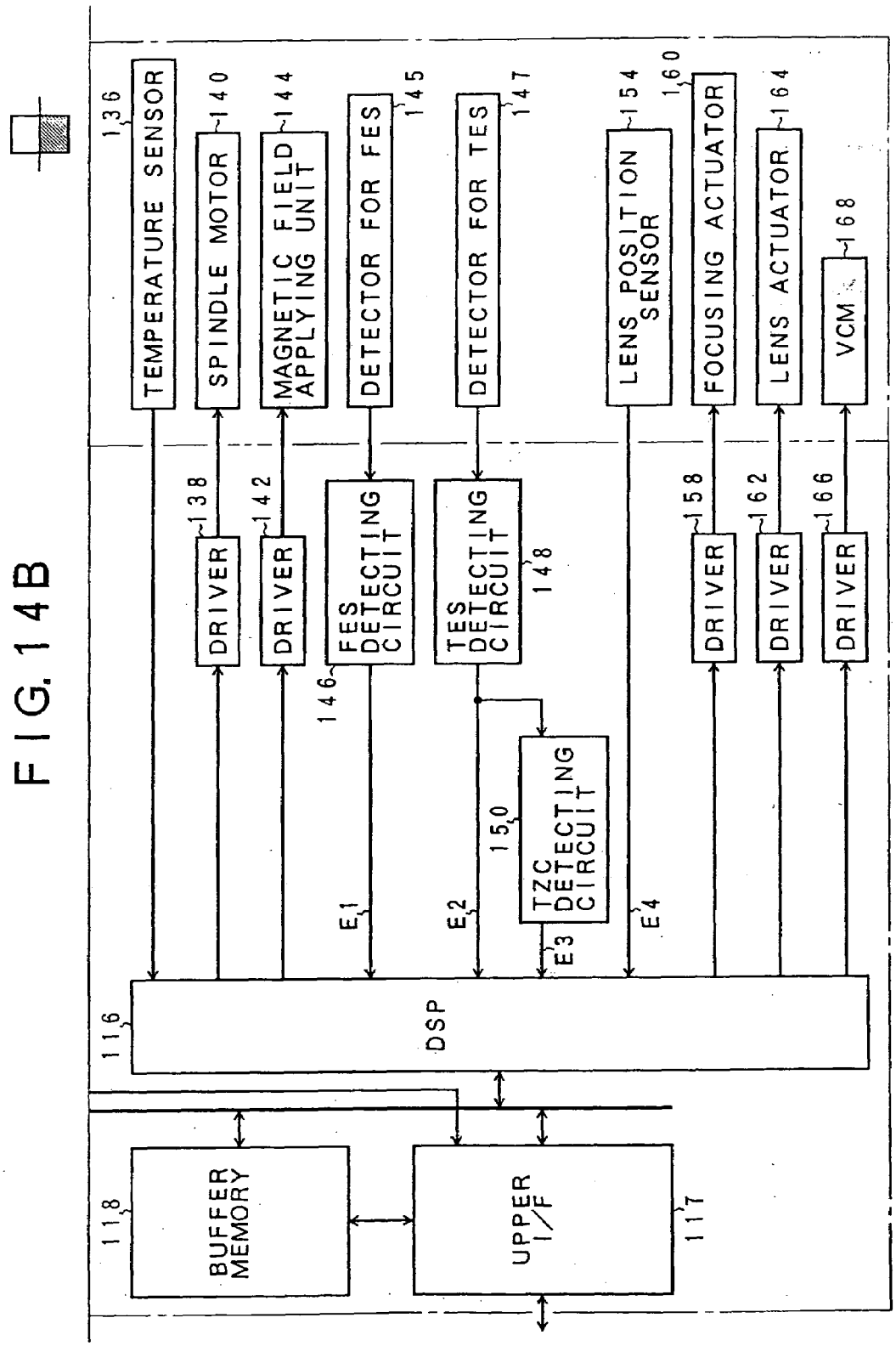

F I G. 1 7
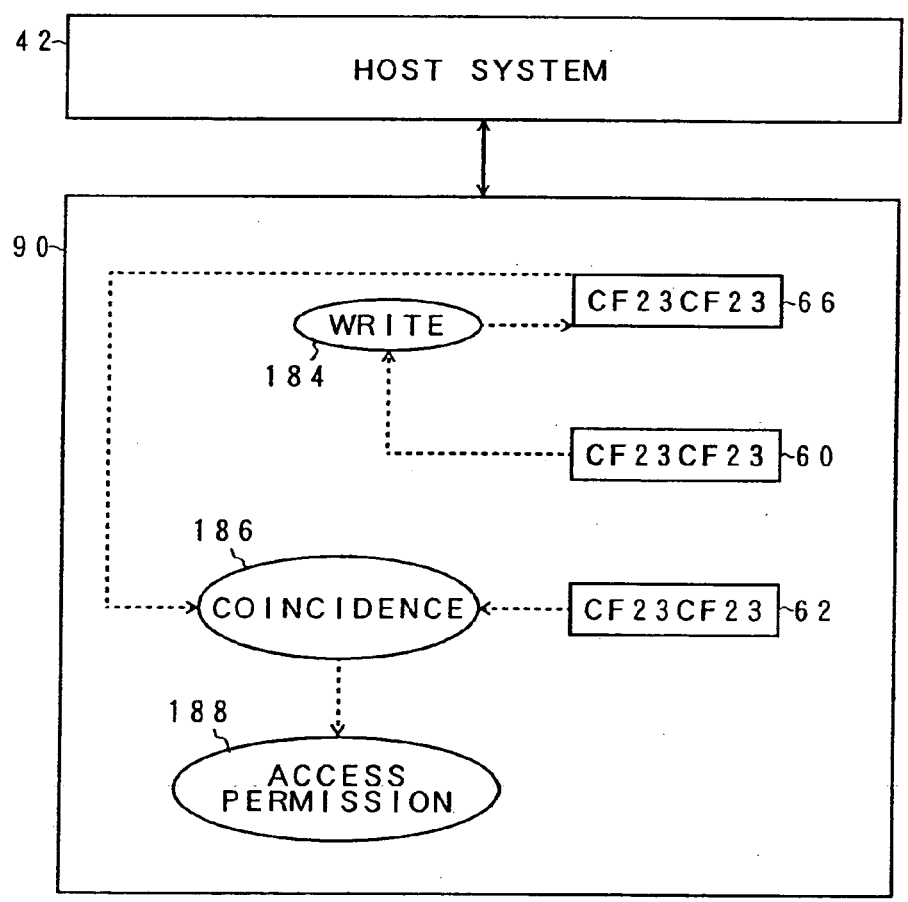

STORING APPARATUS AND PASSWORD CONTROL METHOD

BACKGROUND OF THE INVENTION

The present invention relates to a storing apparatus such as hard disk drive, optical disk drive, or the like which is connected to information processing equipment such as computer, word processor, electronic book, or the like and to a password control method. More particularly, the invention relates to a storing apparatus for protecting an access of information recorded on a medium by a password and relates to its password control method.

Hitherto, in a storing apparatus such as hard disk drive, optical disk drive, or the like, data recorded on a medium is protected by using a password. That is, an identification confirmation is performed by a password so that only a specific person is authorized to read and write data from/to the medium of the storing apparatus and the other persons are not allowed to access to the data. For example, a password is preliminarily written and stored in a storing apparatus or a storage medium. When the user inputs his password at the time of using the storing apparatus and the password inputted by the user and the password stored on the apparatus side coincide with each other, a write command or a read command to the storing medium is accepted. When the passwords do not coincide, the write or read command is not accepted and an error is returned. A system of authorizing a person by the password as mentioned above is not limited to the access protection of the storing apparatus but is used in many cases such as a use of a terminal apparatus in a data communication system and the like. The protection system using the password is widely used since a predetermined effect can be expected although it is a technique which can be easily employed.

Since the access protection using the password as mentioned above is widely used, however, an individual user has a number of passwords and it is often difficult to remember all of the passwords. When the user forgets the password which is used by himself, there is a problem such that even the authorized user cannot access. There is, accordingly, a way of use such that the user records the password in a notebook or the like and confirms the password in the notebook each time the apparatus is used. This results in a problem such that the password is known by stealingly seeing the notebook of the user. In the access protection using the password, since it is presumed that the user is urged to input the password every access, a third party such as a colleague of the user's place of work has many chances to see the password. Those problems are problems accompanied by the operation which always requires an input of a password when the apparatus is used. A technique which can further reduce the frequency of inputting the password by the user while performing the access protection by the password is demanded. As a method of solving the problem, a method of stopping the access protection by the password by eliminating the password at an arbitrary use time point and newly setting a password when the access protection is necessary can be considered. That is, it is a method of setting a password only for a period of time in which the protection is necessary and receiving the access protection. The method has, however, the following problems. First, when a password is set again, the user often sets a password different from the previous password, so that a password management becomes complicated. That is, the user is likely to forget the newest password. Second, there is a danger that a third party steals a glance at a scene when the user resets the password.

SUMMARY OF THE INVENTION

According to the invention, there are provided a storing apparatus and its password control method in which an access is permitted without needing an input of a password by the user depending on a use scene without losing a function of an access protection by a password.

According to the invention, a storing apparatus for protecting an access of information recorded on a medium by a password has a password preserving unit and a password verifying unit. The password preserving unit preserves a general access (default) input password and a password for access protection. When there is no password input from the user, the password verifying unit substitutes the default input password for the user input password and compares and collates the default input password with the password for access protection, thereby controlling the access protection. When there is a password input by the user, the user input password and the password for access protection are compares and collated, thereby controlling the access protection. Especially, when the password preserving unit preserves the same value as a default input password and a password for access protection, even if there is no password input by the user, the password verifying unit substitutes the default input password for the user input password and collates the default input password with the password for access protection, thereby permitting the access. According to the invention as mentioned above, when the default input password is stored on the storing apparatus side and there is no password input from the user, the password verification is performed by regarding the default input password as a user input password. Consequently, by setting the default input password and the password for access protection to the same value, even when the user does not input the password, the access is permitted and an access by an ordinary command can be performed and the password input by the user can be omitted.

The password preserving unit further has a user input password area for storing the user input password. At the start of the use of the apparatus such as turn-on of a power source, command reset, error reset, medium insertion, or the like, the password verifying unit reads out the default input password and writes it into the user input password area. Subsequently, the password verifying unit establishes access permission or access inhibition on the basis of a collation coincidence between the default input password in the user input password area and the password for access protection. After establishing the access permission, each time the password is inputted by the user, the user input password is written in the user input password area and the access permission or the access inhibition is established on the basis of a collation coincidence with the password for access protection.

In case of using a form in which the user certainly needs to perform the input operation of the password, at the start of the use of the apparatus, the password verifying unit waits for the input of the password by the user in a state such that the default input password has been read out and written into the user input password area. When there is the password input by the user, after the default input password in the user input password area was overwritten by the user input password, the password verifying unit collation compares it with the password for access protection, thereby controlling the access protection. When the default input password and the password for access protection are different, information is naturally protected from access as long as the user does not input the authorized password for access protection.

The password preserving unit preserves the default input password and the password for access protection into the medium. In this instance, at the start of the use of the apparatus, the password verifying unit reads out the default input password and the password for access protection from the medium, stores them into a work memory of the unit in the apparatus, and controls the access protection. The password preserving unit can also preserve the default input password and the password for access protection into a non-volatile memory of the apparatus main body. Further, the password preserving unit can also preserve the default input password into the non-volatile memory of the apparatus main body and preserve the password for access protection into the medium. In this case, at the start of the use of the apparatus, the password verifying unit reads out the password for access protection from the medium, stores them into the work memory of the apparatus main body, and controls the access protection. Further, the password preserving unit preserves the password for access protection into the non-volatile memory of the apparatus main body and preserves the default input password into the medium. In this case, at the start of the use of the apparatus, the password verifying unit reads out the default input password from the medium, stores it into the apparatus main body, and controls the access protection.

The medium has a password preserving area for preserving the password into a special area which cannot be accessed by the user by ordinary read command and write command, thereby preventing that the password is read out by the ordinary read command or is rewritten by the write command. Further, there is provided a password rewriting unit for rewriting the default input password or the password for access protection on the basis of a dedicated command from a host system serving as an upper apparatus. As a medium, a medium fixedly enclosed in the apparatus main body or a removal medium which is detachable for the apparatus main body can be also used.

The password preserving unit preserves a plurality of kinds of passwords for access protection according to the kinds of access protection. The password verifying unit permits the access by an ordinary command corresponding to the kind of password for access protection in which the collation coincidence is obtained. For example, the password preserving unit preserves a write/read password for permitting the access by the read and write commands and a read only password for permitting only the access by the read command as passwords for access protection. The password verifying unit permits the access by the ordinary write or read command when the collation coincidence of the write/read password is obtained and permits the access only by the ordinary read command when the collation coincidence of the read only password is obtained.

Further, a validity term setting unit for setting a validity term in the default input password is provided. A state where the password input can be omitted is limitedly continued only for a predetermined period of time, thereby preventing that an unprotected state continues for an inadvertent long period. On the contrary, a method of setting the apparatus into the state where the password can be omitted after the elapse of a predetermined period of time can be also used. That is, by equalizing the default password to the password for access protection after a predetermined period, the apparatus can be set into a state in which the access can be performed after the predetermined period even if a password is not inputted. The validity term setting unit counts the number of times of using the apparatus by a counter. When a count value of the counter reaches a predetermined value, the default input password is forcedly changed to a different value, thereby disenabling the apparatus to be used. The validity term setting unit sets a time of a validity term. If the present time when the apparatus is used exceeds the validity term, the default input password is forcedly changed to a different value, thereby disenabling the apparatus to be used.

According to the invention, there is provided a password control method for protecting an access of information recorded on a medium by a password, comprising:

a password preserving step of preserving a default input password, a password for access protection, and a user input password; and a password verifying step of controlling an access protection by substituting the default input password for the user input password and comparison collating the default input password and the password for access protection when there is no password input from the user and of controlling an access protection by comparison collating the user input password and the password for access protection when there is a password input by the user.

When the same value is preserved as a default input password and a password for access protection, even if there is no password input by the user, in the password verifying step, the default input password is substituted for the user input password and the default input password is collated to the password for access protection, thereby permitting the access. The password preserving step is characterized by preserving a plurality of kinds of passwords for access protection according to the kind of access protection. The password verifying step is characterized by permitting the access by an ordinary command corresponding to the kind of password for access protection in which the collation coincidence is obtained. Further, a validity term setting step of setting a validity term into the default input password is provided. The detailed construction other than the above construction is substantially the same as the apparatus construction.

The above and other objects, features, and advantages of the present invention will become more apparent from the following detailed description with reference to the drawings.

BRIEF DESCRIPTION OF THE DRAWINGS

FIG. 5 is an explanatory diagram of an access kind in the invention;

FIG. 6 is an explanatory diagram of a preserving mode of passwords in the invention;

FIG. 13 is a flowchart for an access protecting process in which the user certainly needs the password inputting operation;

FIGS. 14A and 14B are block diagrams of an optical disk drive to which the invention is applied;

FIG. 17 is an explanatory diagram for an access protecting process for capturing an access permission by a default input password without inputting a password to an MO drive by the user;

DETAILED DESCRIPTION OF THE
PREFERRED EMBODIMENTS

[Storing Apparatus of Fixed Medium]

Figure 1:
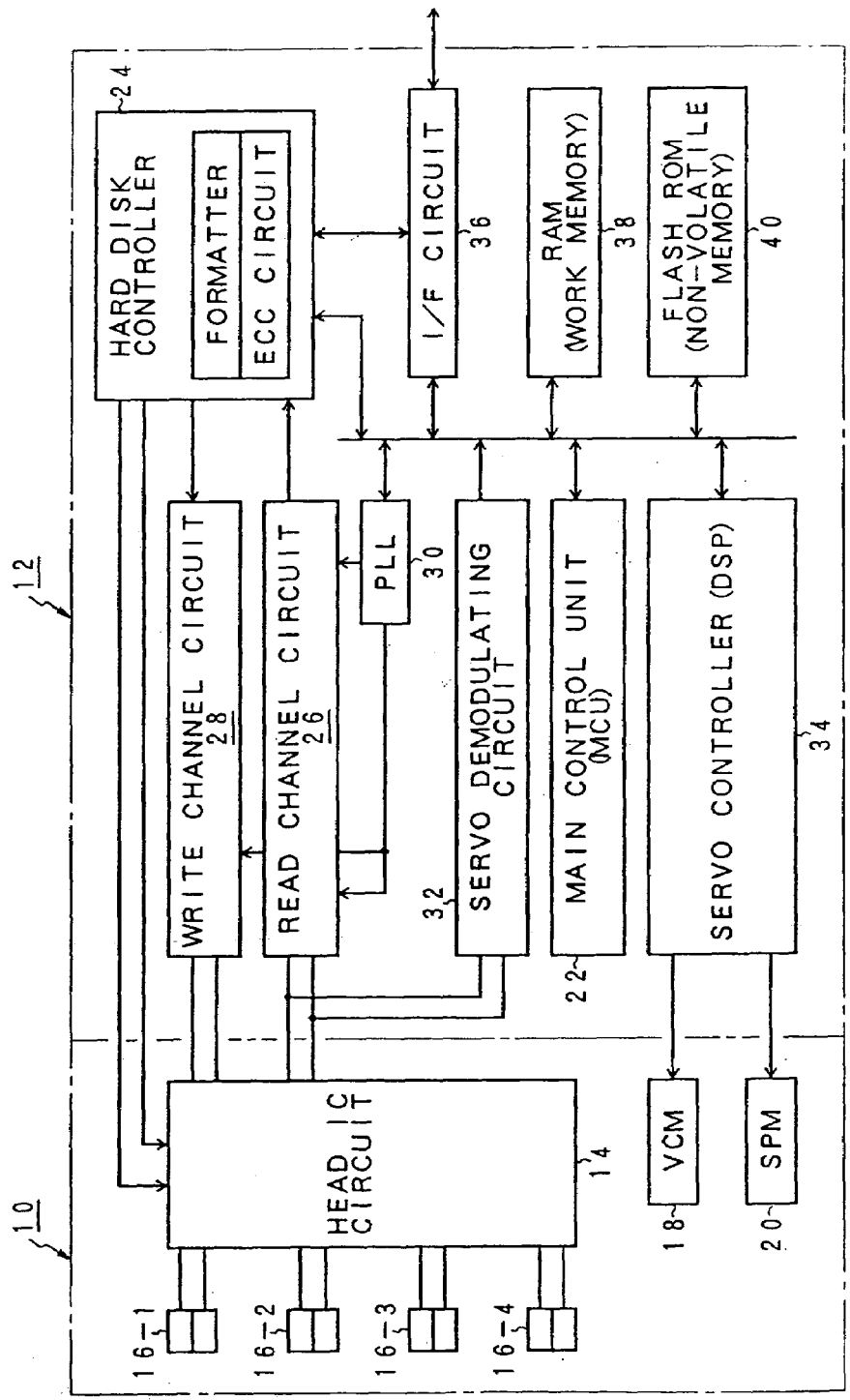
FIG. 1 is a block diagram of a hard disk drive to which the invention is applied.

FIG. 1 is a block diagram of a hard disk drive (HDD) to which a password protection using a general access (default) input password of the invention is applied. In the hard disk drive, a magnetic disk medium is fixedly built in a drive main body. The hard disk drive is constructed by an enclosure 10 and a control board 12. The enclosure 10 has a head IC circuit 14 and four head assemblies 16-1 to 16-4 are connected thereto in the embodiment. Each of the head assemblies 16-1 to 16-4 has a recording head using an inductive head and a reproducing head using an MR head or the like. The enclosure 10 also has a VCM 18 for driving a head actuator and a spindle motor 20 for rotating a disk medium. For the head IC circuit 14 in the enclosure 10, a write channel circuit 28 and a read channel circuit 26 are provided on the control board 12 side. A hard disk controller 24 is provided for the write channel circuit 28 and the read channel circuit 26. A formatter, an ECC circuit, and the like are built in the hard disk controller 24. The hard disk controller 24 is connected to an interface circuit 36. The supply of write data from a host serving as an upper apparatus and the transfer of read data to the host are executed by a data transmission from/to the host side. As an interface circuit 36, a proper interface such as SCSI interface, ATA interface, ATAPI interface, SCSI, or the like can be used. In the embodiment, a constant density recording system (ZCDR) by a zone division is used as a recording system of a disk medium. Cylinders of the disk medium are divided into zones every predetermined number of cylinders and different frequencies have been preset for respective zones. For this purpose, a PLL circuit 30 functioning as a frequency synthesizer is provided. By setting a corresponding zone frequency from a cylinder address upon reading or writing operation, clocks are supplied to the write channel circuit 28 and read channel circuit 26. The whole control of the hard disk drive is performed by an MCU (main control unit) 22. The hard disk controller 24 and interface circuit 36 are connected to the MCU 22 via a bus and, further, an RAM 38 functioning as a work memory and a flash ROM 40 functioning as a non-volatile memory are connected. The MCU 22 receives and decodes various commands from the host, instructs the hard disk drive to perform an ordinary reading or writing operation by an ordinary command, and instructs a servo controller 34 to execute a head positioning control by the VCM 18 provided for the enclosure 10. In order to execute the head positioning control by the driving of the VCM 18, a servo demodulating circuit 32 and the servo controller 34 are provided. In the embodiment, as servo information of the disk medium, a data surface servo system is used. Therefore, servo information is separated from a reproduction signal for the read channel circuit 26 and head position information is reconstructed by the servo demodulating circuit 32.

Figure 2:
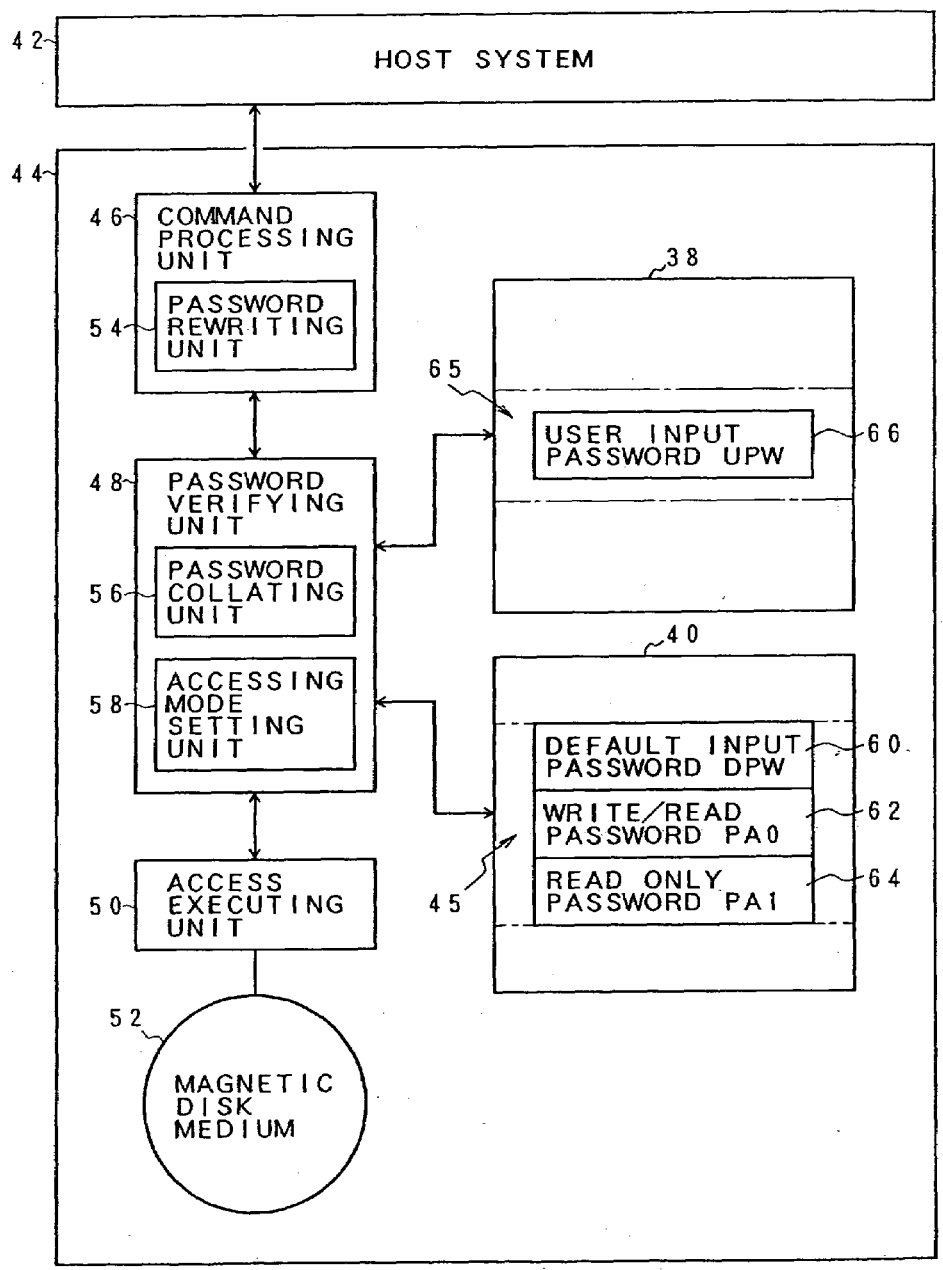
FIG. 2 is a functional block diagram of an embodiment of the invention in which a password has been preserved in a drive main body.

FIG. 2 is a functional block diagram for access protection according to the invention using a password which is realized by a program control of the MCU 22 provided for the control board 12 in FIG. 1. As an external storing apparatus for a host system 42 serving as an upper apparatus, a hard disk drive 44 is connected. The non-volatile memory 40 in the hard disk drive 44 has a password preserving area 45 in the embodiment. In the password preserving area 45, a default input password (DPW) 60, a write/read password (PA0) 62, and a read only password (PA1) 64 are preserved. The work memory 38 using an RAM has a user input password storing area 65 for storing a user input password (UPW) 66. The write/read password 62 and read only password 64 stored in the non-volatile memory 40 are passwords for access protection for permitting an access determined by each password when a password collation coincidence is obtained as a result of the collation with the user input password 66 inputted by the user from the upper apparatus. That is, when the collation coincidence with the user input password 66 is obtained, the write/read password 62 permits a write access by an ordinary write command or a read access by an ordinary read command to a disk medium 52. On the contrary, when the collation coincidence with the user input password 66 is obtained, the read only password 64 permits only the read access to the disk medium 52 by the ordinary read command. That is, the write/read password 62 and read only password 64 have a password function for determining the kind of access simultaneously with the access protection. Although the access protection using the write/read password 62 and read only password 64 for access protection is the same as the conventional access protection using a password, in addition, the default input password 60 is newly preserved in the invention.

The default input password 60 is a password for permitting an access to the disk medium 52 in the hard disk drive 44 even if the user input password 66 is not received from the host system 42 serving as an upper apparatus. Specifically, when there is no password input from the host system 42 serving as an upper apparatus by the user at the start of the use of the hard disk drive 44, the default input password 60 preserved in the non-volatile memory 40 is regarded as a user input password 66 and is collation compared with the write/read password 62 and read only password 64 serving as passwords for access protection. By the collation comparison, for example, when the default input password 60 coincides with the write/read password 62, the write access and read access by the ordinary commands are permitted as access kinds which are designated by the write/read password 62. In order to perform the access protection using the default input password 60, the hard disk drive 44 has a command processing unit 46, a password verifying unit 48, and an access executing unit 50. The command processing unit 46 receives and decodes a command from the host system 42 serving as an upper apparatus and executes a necessary process. For example, at the start of the use of the apparatus, when the user inputs a password, the password inputted by the user is sent to the hard disk drive 44 by a password transfer command. The password transferring command is decoded by the command processing unit 46 and the user input password 66 acquired as a command parameter is written into the user input password storing area 65 in the work memory 138. The command processing unit 46 also has a password rewriting unit 54. The default input password 60, write/read password 62, and read only password 64 stored in the non-volatile memory 40 can be rewritten and changed by a password rewriting dedicated command which is supported by an interface for the host system 42 serving as an upper apparatus. As a password rewriting command, for example, in case of the SCSI interface, a format command, a vendor unique command, or the like can be used. The password verifying unit 48 has a password collating unit 56 and an accessing mode setting unit 58. At the start of the use of the hard disk drive 44, the password collating unit 56 first reads out the default input password 60 from the non-volatile memory 40 and writes it into the user input password storing area 65 in the work memory 38. Consequently, at the start of the use of the apparatus, a value of the default input password 60 is first set as a user input password 66. As processes after the default input password 60 was written as a user input password 66 into the user input password storing area 65 in the work memory 38, there are the following two processes.

I. a process for executing a password collation without waiting for a password input by the user II. a process for waiting for an executing operation for the password input by the user and executing a password collation In the process which does not wait for the password input by the user, when the writing of the default input password 60 into the user input password storing area 65 in the work memory 38 is finished, the user input password 66 is read from the work memory 38, the write/read password 62 is read out from the non-volatile memory 40, and the passwords 66 and 62 are collated with each other. When the collation coincidence is obtained by the password collation, an accessing mode which is determined by the write/read password 62 is set by the accessing mode setting unit 58 and a permitting state of the write access by the ordinary write command and the read access by the read command from the host system 42 serving as an upper apparatus is established for the access executing unit 50. On the other hand, in the process which waits for the password input operation by the user from the host system 42 serving as an upper apparatus, after the default input password 60 was written into the user input password storing area 65 in the work memory 38 by the password collating unit 56, the apparatus waits for the reception of the password transfer command from the host system 42 serving as an upper apparatus. When the password transfer command is received by the command processing unit 46, the password received as a command parameter is overwritten into the user input password storing area 65 in the work memory 38. The user input password 66 after overwriting and the write/read password 62 in the non-volatile memory 40 are read out and collated by the password collating unit 56. When the collation coincidence is obtained, the writing/reading mode is set as an accessing mode by the accessing mode setting unit 58. In this case, in the invention, with respect to the case where the user does not input a character train of the password and executes the password input in the host system 42 serving as an upper apparatus while an input column of the password is left vacant, even if the character train of the user input password is not substantially received, the access permitting state based on the default input password 60 is established. That is, even if the command processing unit 46 receives the password transfer command from the upper apparatus, when the character train of the password as a command parameter is a space character train, the password collating unit 56 reads out the user input password 66 which has already been rewritten to the default input password 60 and collates it with the write/read password 62 in the non-volatile memory 40. When the collation coincidence is obtained, the writing/reading mode is set as an accessing mode by the accessing mode setting unit 58. As the contents of an apparatus use start timing when the password verifying unit 48 in the hard disk drive 44 executes the access protection based on the default input password 60 in the non-volatile memory 40, there are the following timings.

I. when the power source of the hard disk drive 44 is turned on,

II. when a command is reset by an interface with the host system 42 serving as an upper apparatus, III. when the hard disk drive 44 enters a serious error state and is recovered by an internal reset, and the like.

Figure 3:
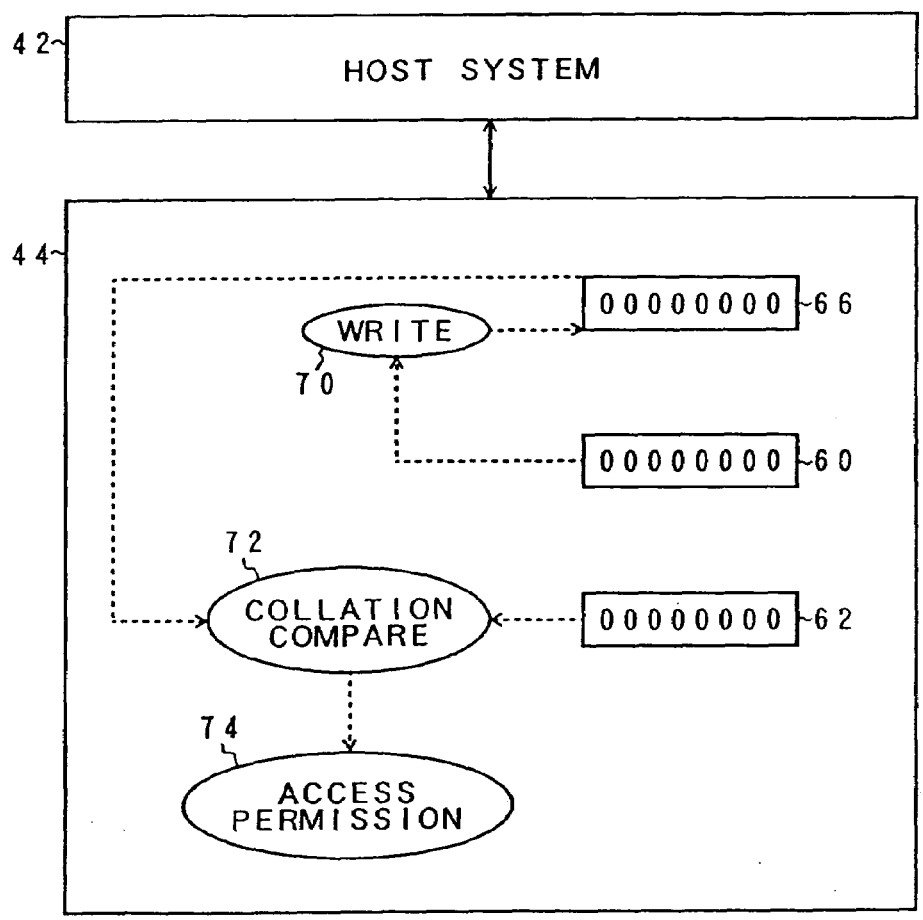
FIG. 3 is an explanatory diagram for an access protecting process for capturing an access permission by a default input password in the case where there is no password input by the user.

FIG. 3 shows a processing operation of the access protection which does not require the password input of the user in FIG. 2. The default input password 60, write/read password 62, and read only password 64 preserved in the non-volatile memory 40 in FIG. 2 have been initialized to a predetermined specific value, for example, all "0" when the hard disk drive 44 is initialized in a low level format. The hard disk drive 44 in FIG. 3 has the default input password 60 and write/read password 62 which are in the initializing state and each password is equal to "00000000h" in hexadecimal. The read only password 64 in FIG. 2 which is not shown in FIG. 3 is also equal to "00000000h". When it is assumed that the power source of the hard disk drive 44 is turned on in such a state where the default input password 62 and write/read password 62 are preserved by the same value by the initialization, on the hard disk drive 44 side, the password verifying unit 48 in FIG. 2 first reads out the default input password 60 and executes a writing process 70 for writing the default input password 60 as a user input password 66 into the user input password storing area 65 in the vacant state. Subsequently, the user input password 66 in which the value of the default input password 60 has been written and the write/read password 62 are read out and a collation comparing process 72 is executed. In this case, the user input password 66 has the same value as that of the write/read password 62 by the writing process 70 using the default input password 60. When the collation coincidence is obtained, an access permission 74 which provides the writing/reading mode is performed. The case where the value of each of the default input password 60 and write/read password 62 is equal to "00000000h" by the initialization has been described here as an example. After the hard disk drive 44 established the access permission and the write and/or read access was permitted, the values of the default input password 60, write/read password 62, and further, read only password 64 can be rewritten to other values by a password rewriting command from the upper interface. Further, the value of the read only password 64 can be rewritten to another value. The rewriting of the passwords is executed by the password rewriting unit 54 in the command processing unit 46 in FIG. 2.

Figure 4:
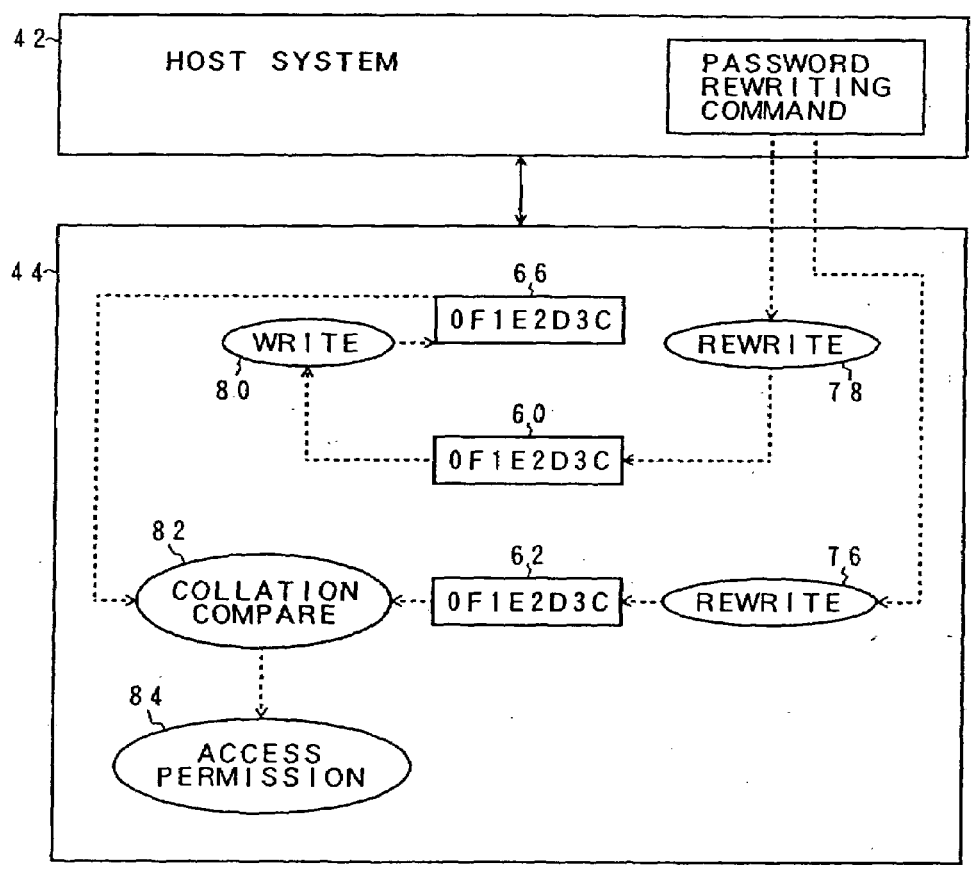
FIG. 4 is an explanatory diagram for a command rewriting process of the default input password and a password for access control.

FIG. 4 shows a password rewriting process by the password rewriting unit 54 in FIG. 2. A rewriting command of the write/read password (access protection password) 62 is first issued from the host system 42 side serving as an upper apparatus. The rewriting command of the write/read password 62 is, for example, [Change Password "0F1E2D3C"]. By the rewriting command, the value "00000000h" of the write/read password 62 in FIG. 3 is rewritten to "0F1E2D3Ch" by a rewriting process 76 in FIG. 4. When the write/read password 62 is rewritten as mentioned above, to establish the access permission which does not need the password input by the user, the default input password 60 is also rewritten to the same value as the write/read password 62. The rewriting command of the default input password 60 is, for example, [Change Default Psw "0F1E2D3C"] and the default input password 60 is rewritten to the same value as the write/read password 62 by a rewriting process 78. The access protection password can be also rewritten in association with the default input password which has been set.

After the default input password 60 and write/read password 62 as an access protection password were rewritten to the other values, when the use of the hard disk drive 44 is restarted, even if the user does not input the password by the host system 42 serving as an upper apparatus, the value of the default input password 60 is written as a user input password 66 by a writing process 80. When a collation comparing process 82 between the user input password 66 in which the default input password 60 has been written and the write/read password 62 is executed next, since the passwords coincide with each other, an access permission 84 of the write/read access is established. It will be obviously understood that if the user wants to inhibit the access when a correct password is not inputted, it is sufficient to rewrite either one of the default input password 60 and write/read password 62 which have been set to all "0" due to the initialization in FIG. 3 to another value. When the default input password 60 and write/read password 62 are different, dissidence is obtained by the collation coinciding process, so that the access permission cannot be obtained. The access permission can be established only by the password input by the user which coincides with the write/read password 62.

FIG. 5 shows an accessing mode and access contents of the hard disk drive 44 which are established by the accessing mode setting unit 58 provided for the password verifying unit 48 in FIG. 2. That is, the accessing mode comprises three modes of a writing/reading mode, a read only mode, and a security mode. In the writing/reading mode, the ordinary read command and write command are accepted. A change of the default input password, write/read password, and read only password is also permitted. In the read only mode, only the ordinary read command is accepted. In this case as well, a change of the default input password, write/read password, and read only password is permitted. Further, in the security mode, although the access by the ordinary read command and write command is perfectly inhibited, the read command or write command accompanied with the password input is accepted. It will be obviously understood that the access for each command is permitted for the first time when the password collation coincidence is obtained. The embodiment of FIG. 2 relates to the case where the default input password 60, write/read password 62, and read only password 64 have been preserved in the non-volatile memory 40 of the hard disk drive 44. However, as another embodiment of the invention, all of the passwords can be stored in the magnetic disk medium 52 or can be also separately preserved into the non-volatile memory 40 and magnetic disk medium 52 of the hard disk drive 44.

FIG. 6 shows a preserving mode of the password in the hard disk drive 44 of the invention. A preserving mode 1 relates to the embodiment of FIG. 2 and both of the default input password and the password for access protection are stored on the hard disk drive 44 side. A preserving mode 2 relates to the case where all of the default input password and the password for access protection are stored in the magnetic disk medium 52. A preserving mode 3 relates to the case where the default input password is stored on the hard disk drive 44 side and the password for access protection is stored on the magnetic disk medium 52 side. Further, a preserving mode 4 relates to the case where the default input password is preserved in the magnetic disk medium 52 and the password for access protection is stored in the hard disk drive 44. The preserving modes 2, 3, and 4 will now be specifically explained with reference to FIGS. 7, 9, and 10.

Figure 7:
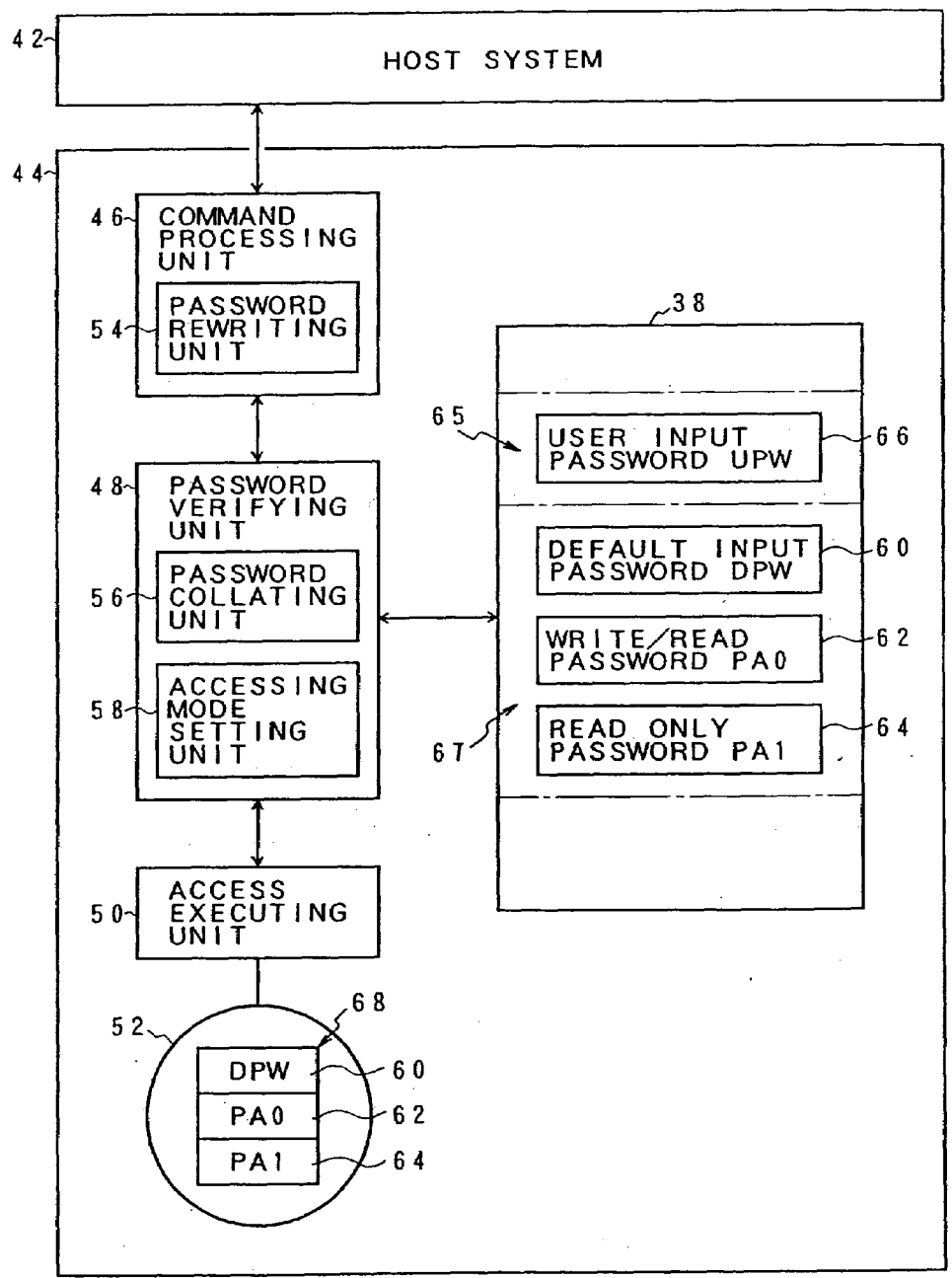
FIG. 7 is a functional block diagram of an embodiment of the invention in which a password has been preserved in only a medium.

FIG. 7 shows the preserving mode 2 in FIG. 6. The default input password 60, write/read password 62, and read only password 64 are preserved in a password storing area 68 of the magnetic disk medium 52. Therefore, at the start of the use of the hard disk drive 44, the password verifying unit 48 reads out the default input password 60, write/read password 62, and read only password 64 from the magnetic disk medium 52 via the access executing unit and develops them into a password storing area 67 in the work memory 38. The user input password storing area 65 to store the user input password 66 is assured in the work memory 38.

Figure 8:
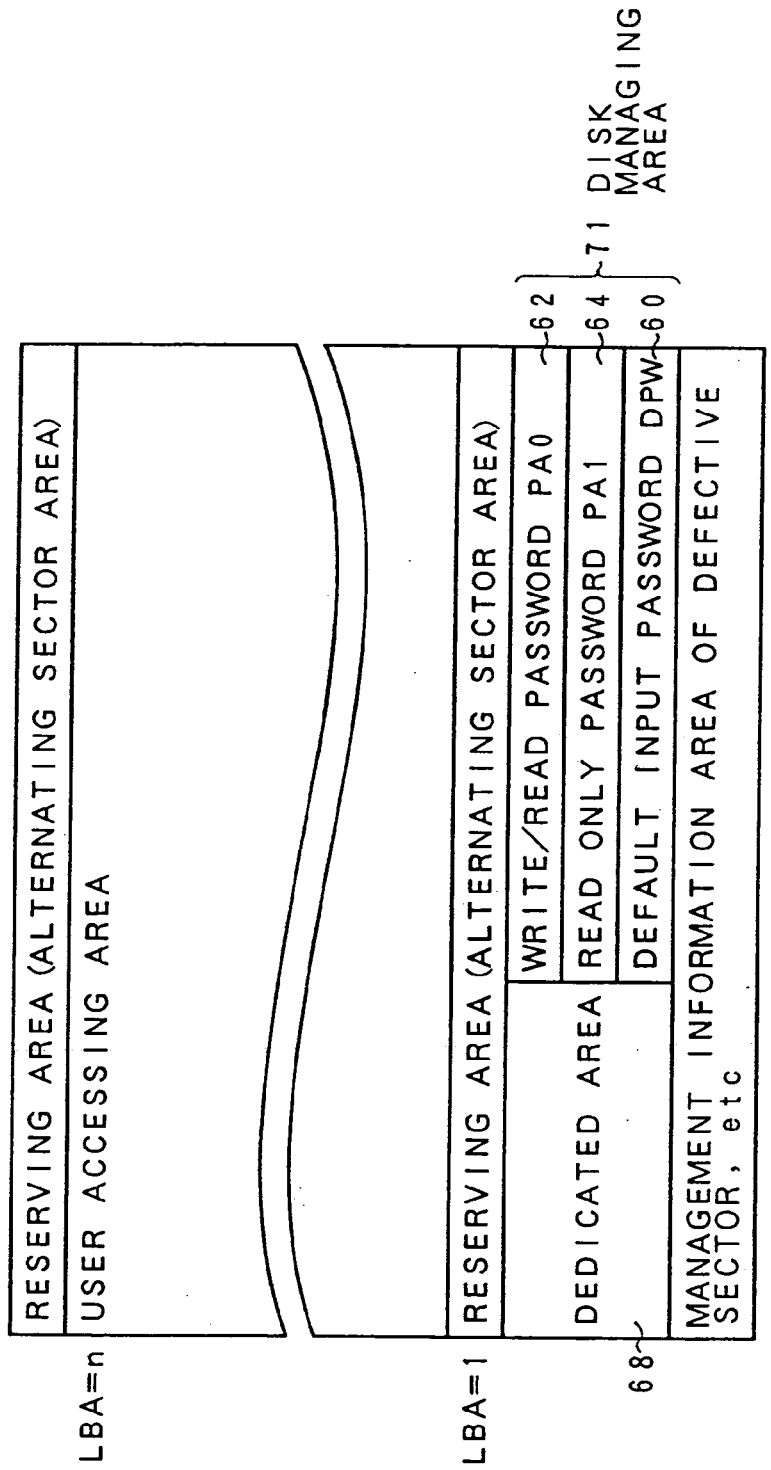
FIG. 8 is an explanatory diagram of a password preserving area in the medium in FIG. 7.

FIG. 8 shows a password preserving state of the magnetic disk medium 52 in FIG. 7. In the embodiment, since a logical block address LBA=1 of the magnetic disk medium has been allocated to a disk managing area 71 which cannot be accessed by the ordinary read command or write command, the password storing area 68 is assured as a dedicated area in the disk managing area 71. The default input password 60, read only password 64, and write/read password 62 are preserved in the password storing area 68.

Figure 9:
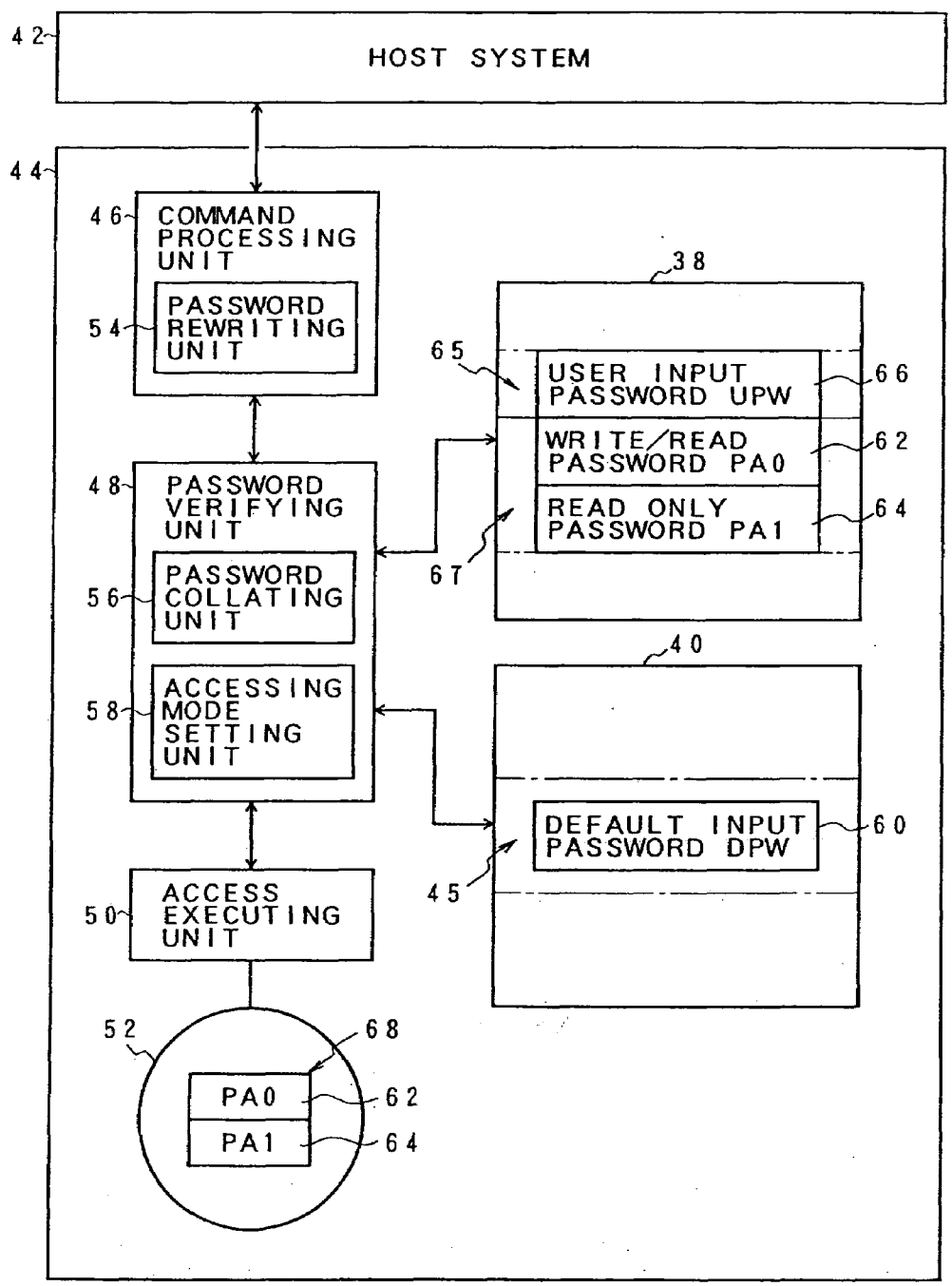
FIG. 9 is a functional block diagram of an embodiment of the invention in which a password has been separately preserved in the drive main body and the medium.

FIG. 9 relates to the preserving mode 3 in FIG. 6. The default input password 60 is preserved in the password preserving area 45 assured in the non-volatile memory 40 serving as a hard disk drive 44 side. On the other hand, the write/read password 62 for access protection and read only password 64 are preserved in the password storing area 68 of the magnetic disk medium 52. Therefore, the password storing area 67 is assured in the work memory 38. At the start of the use of the hard disk drive 44, the password verifying unit 48 first reads out the write/read password 62 and read only password 64 from the password storing area 68 of the magnetic disk medium 52 through the access executing unit 50 and develops them into the work memory 38. Obviously, the user input password storing area 65 to store the user input password 66 is also assured in the work memory 38.

Figure 10:
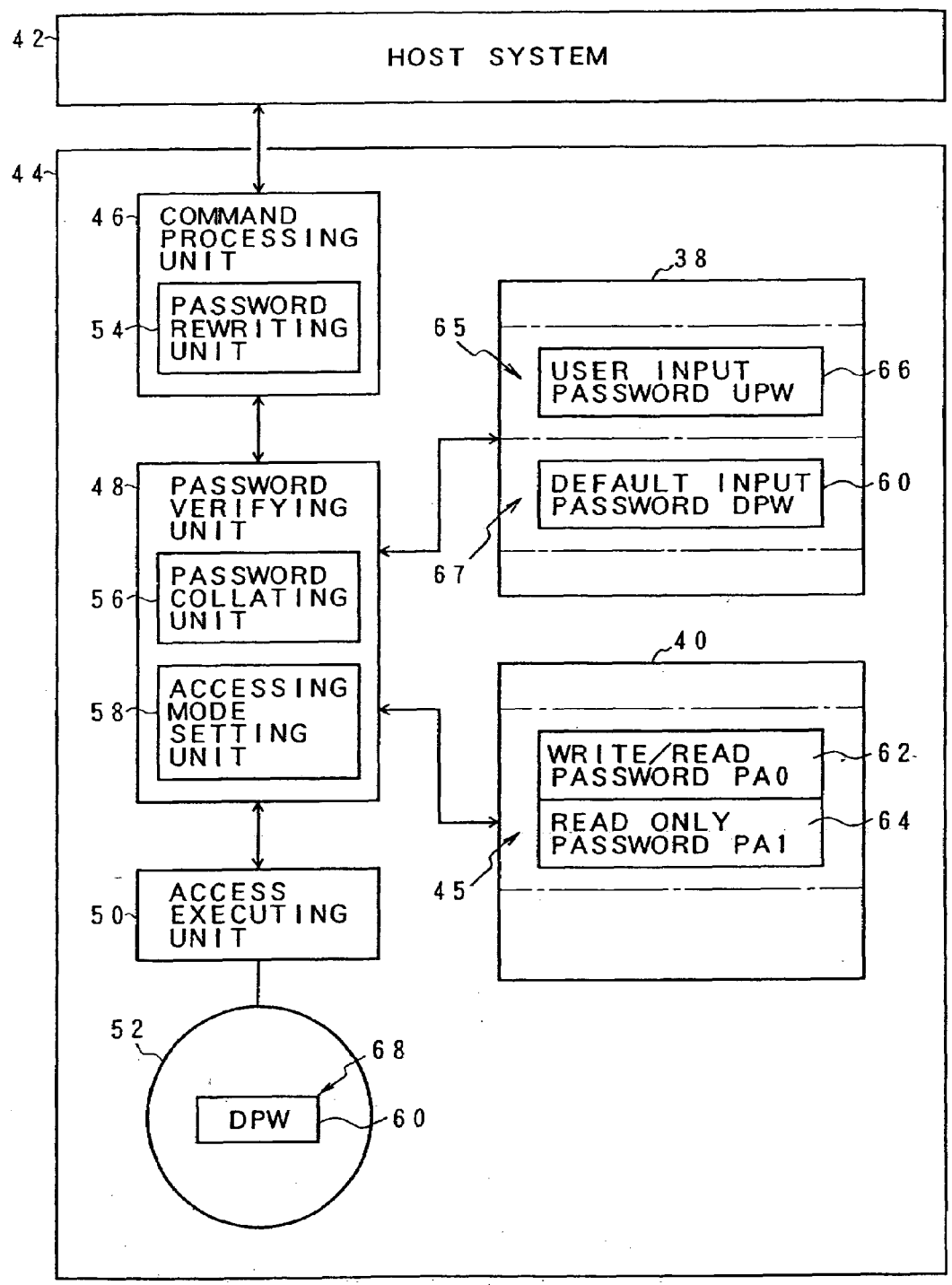
FIG. 10 is a functional block diagram of another embodiment of the invention in which a password has been separately preserved in the drive main body and the medium.

FIG. 10 relates to the preserving mode 4 in FIG. 6. In the embodiment, the default input password 60 is preserved in the password storing area 68 of the magnetic disk medium 52. On the other hand, the write/read password 62 for access protection and read only password 64 are preserved in the password preserving area 45 provided in the non-volatile memory 40 of the hard disk drive 44. The password storing area 67 is assured in the work memory 38. At the start of the use of the hard disk drive 44, the password verifying unit 48 first reads out the default input password 60 from the password storing area 68 of the magnetic disk medium 52 through the access executing unit 50 and develops it into the work memory 38 as shown in the diagram. Processing functions of the command processing unit 46, password verifying unit 48, access executing unit 50, password rewriting unit 54, password collating unit 56, and accessing mode setting unit 58 provided in the hard disk drive 44 in each of the preserving modes 2, 3, and 4 in FIGS. 7, 9, and 10 are the same as those in the embodiment of the preserving mode 1 in FIG. 2.

Figure 11:
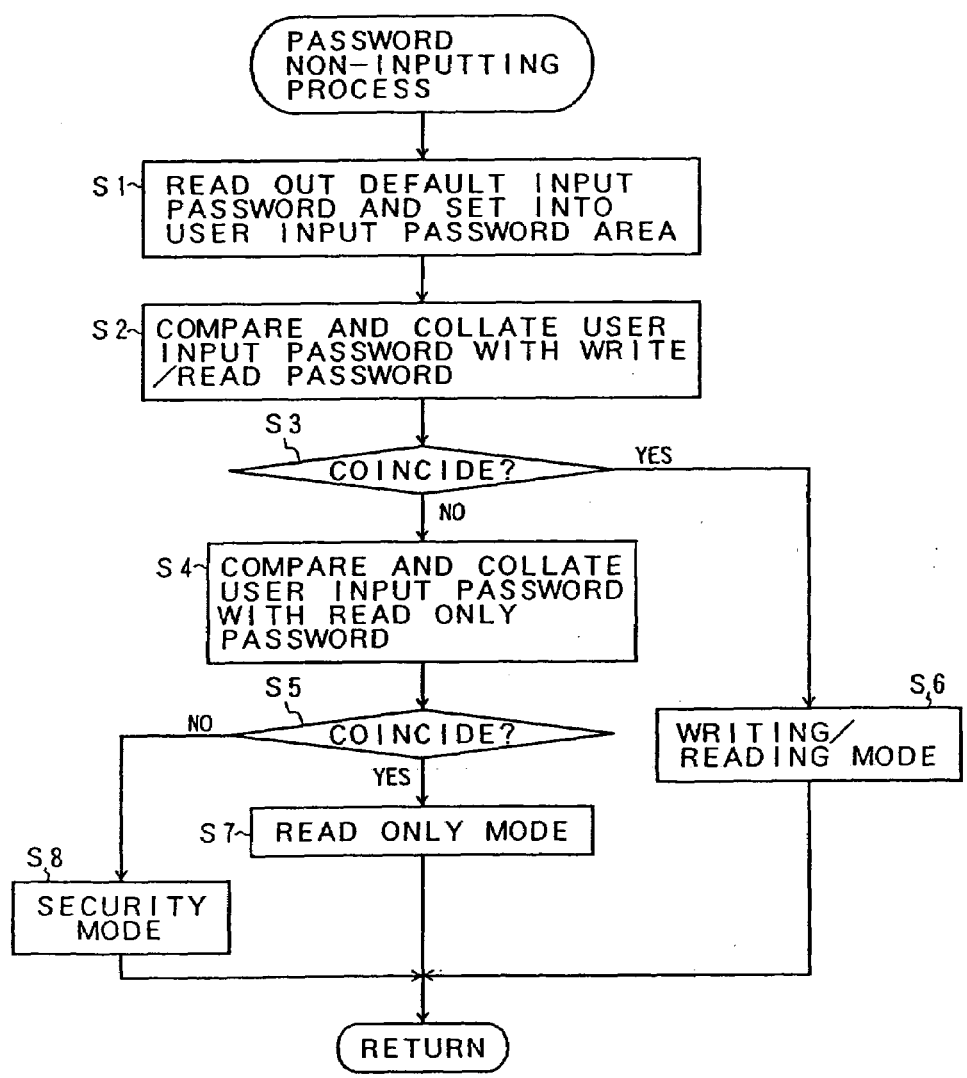
FIG. 11 is a flowchart for an access protecting process in the case where there is no password input by the user.

FIG. 11 is a flowchart for an access protecting process in which the password input by the user is unnecessary in the access protection of the invention for the hard disk drive 44 as a target. This process will now be described with respect to the embodiment of the preserving mode 1 in FIG. 2 as an example. When the use of the hard disk drive 44 is started in response to the turn-on of the power source of the hard disk drive 44, a reset command of the interface during the operation, further, an internal reset from a serious error, or the like, first in step S1, a setting process for reading out the default input password 60 and writing into the user input password storing area 65 is executed. In step S2, the user input password 66 rewritten to the default input password 60 and the write/read password 62 are compared and collated. In this instance, as shown in FIG. 3, if the user input password 66 and write/read password 62 are set to the same value, the collation coincidence is obtained in step S3. The writing/reading mode is established in step S6. In step S3, when the user input password 66 rewritten by the default input password 60 does not coincide with the write/read password 62, the read only password 64 is compared and collated with the user input password 66 rewritten by the default input password 60 in step S4. As a result of the comparison collation, when the collation coincidence is obtained in step S5, the read only mode is set in this case in step S7. When the collation dissidence is obtained even in step S5, the processing routine advances to the security mode in step S8. The access by the ordinary read command or write command is perfectly inhibited and only the access in response to the password input by the user is accepted.

Figure 12:
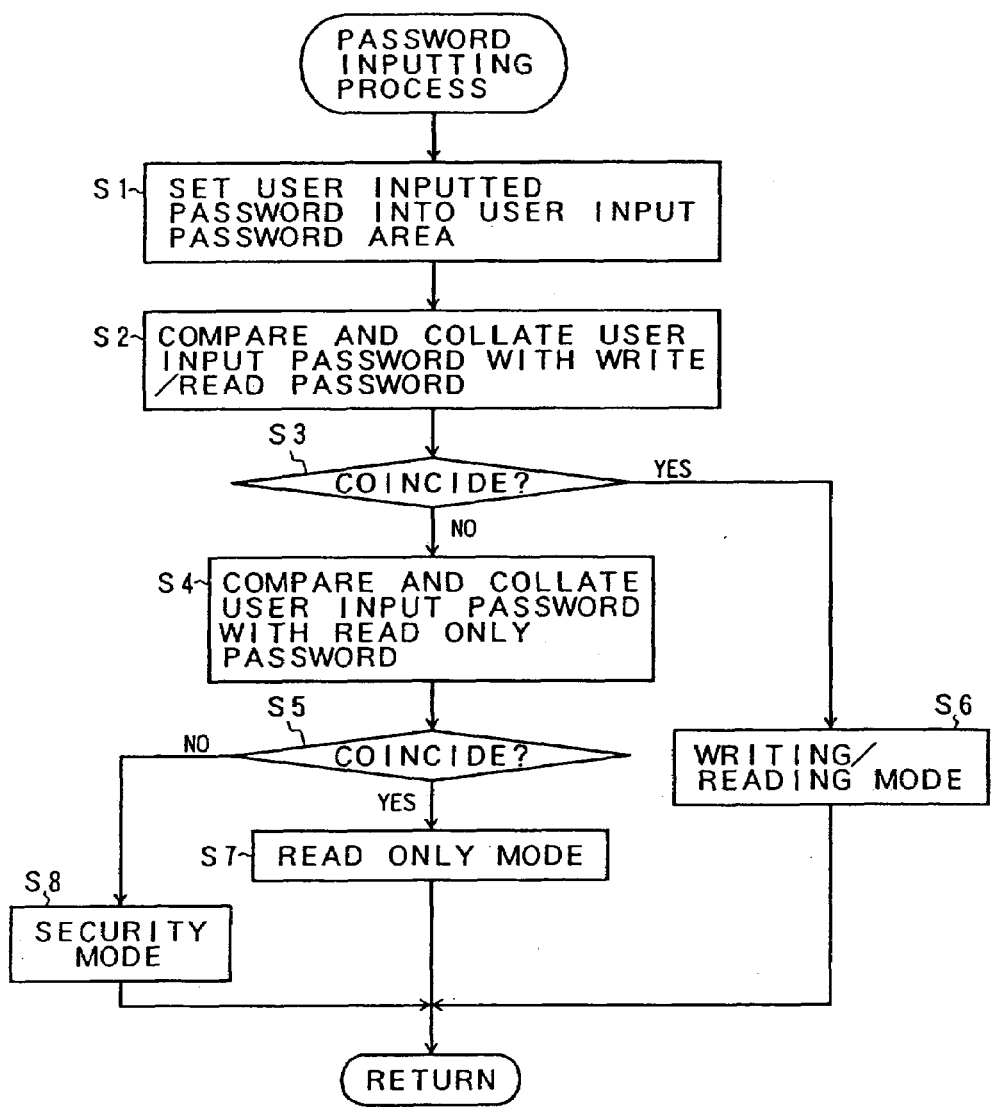
FIG. 12 is a flowchart for an access protecting process in the case where the user inputs a password.

FIG. 12 is a flowchart for an access protecting process in the case where the user inputs a password. The process in the case where the user inputs the password is executed so long as there is the password input by the user at any one of the proper timings corresponding to a state where the processing routine enters the security mode in step S8 in FIG. 11, the case where the user inputs the password at the time of the start of the use of the apparatus, and further, during the operation. First, when a password transfer command in association with the password input by the user is received, in step S1, the password inputted by the user is set as a user input password 66 into the user input password storing area 65 in the work memory 38. In step S2, the user input password 66 and write/read password 62 are compared and collated. When the collation coincidence is obtained in step S3, the writing/reading mode is set in step S6. If they do not coincide, the user input password is compared and collated with the read only password in step S4. If the collation coincidence is obtained in step S5, the read only mode is set in step S7. When the collation dissidence is obtained even in step S5, the security mode is set in step S8 and the access by the ordinary command is completely inhibited.

FIG. 13 is a flowchart for another embodiment of the access protection of the invention for the hard disk drive 44 as a target. In the flowchart, the password inputting operation by the user is certainly necessary. The processes in FIG. 13 will now be described as follows with regard to the embodiment of the preserving mode 1 in FIG. 2 as an example. When the use of the apparatus is started by the turn-on of the power source of the hard disk drive 44 or the like, first in step S1, the default input password 60 is read out and set as a user input password 66 into the user input password area 65. In step S2, the apparatus waits for the password input of the user. When the password transfer command is received by the execution of the password inputting operation of the user, the presence or absence of the password input by the user is discriminated. The processing routine advances to step S3 and a check is made to see if the password inputted by the user is a vacant character train. If the character train has been normally stored in the password inputted by the user, step S4 follows and the password inputted by the user is overwritten into the user input password area 65. When the password inputted by the user is the vacant character train, the overwriting in step S4 is not performed. The value of the default input password 60 written in step S1 is left as it is as a user input password 66. In step S5, the user input password 66 and write/read password 62 are compared and collated. If the collation coincidence is obtained in step S6, the writing/reading mode is set in step S9. When the collation dissidence is obtained, the user input password 66 and read only password 62 are compared and collated in step S7. When the collation coincidence is obtained in step S8, the read only mode is set in step S10. When the collation dissidence is derived, the security mode is set in step S11 and the access by the ordinary command is inhibited. In the processes of FIG. 13, in the case where the user does not input a character train of the password but executes only the executing operation of the password input, the vacant character train of the password inputted by the user is recognized and the comparison collation using the default input password in place of the user input password is executed. Substantially, the user can establish the accessible state of the hard disk drive 44 without needing the character train of the password.

[Storing Apparatus of the Removable Medium]

FIGS. 14A and 14B are circuit block diagrams of a magnetooptic disk drive as a storing apparatus using a removable medium to which the invention is applied. The embodiment can be obviously applied as it is to a changeable storing apparatus such as removable magnetic disk, phase change type optical disk, or the like. The optical disk drive is constructed by a control board 110 and an enclosure 111. The control board 110 comprises: an MCU 112 to perform a whole control of the magnetooptic disk drive; an RAM 106 serving as a work memory; a flash ROM 108 serving as a non-volatile memory; an interface 117 for transmitting and receiving commands and data to/from an upper apparatus; a magnetooptic disk controller (ODC) 114 to perform processes which are necessary to write and read data to/from the optical disk medium; a DSP 116; and a buffer memory 118. A formatter 114-1 and an ECC processing unit 114-2 are provided for the magnetooptic disk controller 114. At the time of the write access, the formatter 114-1 divides NRZ write data on a sector unit basis of the medium and forms a recording format. The ECC processing unit 114-2 forms and adds an ECC code on a sector write data unit basis and, further, forms and adds a CRC code as necessary. Moreover, the sector data after completion of the ECC encoding is converted into, for example, a 1-7 RLL code. At the time of the read access, the demodulated sector read data is inversely converted from the 1-7 RLL code and is subjected to a CRC check by the ECC processing unit 114-2. After that, error detection and correction are performed. In addition, the NRZ data of the sector unit is coupled by the formatter 114-1, thereby forming a stream of the NRZ read data and transferring it to the upper apparatus. A write LSI circuit 120 is provided for the optical disk controller 114. A write modulating unit 121 and a laser diode control unit 122 are provided for the write LSI circuit 120. A control output of the laser diode control unit 122 is supplied to a laser diode unit 130 provided on the enclosure 111 side. The laser diode unit 130 integratedly has a laser diode 130-1 and a detector 130-2 for monitoring. The write modulating unit 121 converts the write data into a data format of the PPM recording or PWM recording. A magnetooptic storage medium is used as a removable medium to perform the recording and reproduction by using the laser diode unit 130. A recording format of the medium is the zone CAV. Further, as a recording system of the medium, the pit position recording (PPM) recording to record data in correspondence to the presence or absence of a mark on the medium or a pulse width recording (PWM recording) to make the edges of the mark, namely, a leading edge and a trailing edge correspond to the data is used. When an MO cartridge medium is loaded into the optical disk drive, an ID portion of the medium is first read, the kind of medium is recognized by the MCU 112 from a pit interval, and a recognized result of the kind is notified to the write LSI circuit 120. The sector write data from the optical disk drive 114 is converted into PWM recording data by the write modulating unit 121. The PWM recording data converted by the write modulating unit 121 is supplied to the laser diode control unit 122 and is written to the medium by the light emission driving of the laser diode 130-1. A read LSI circuit 124 is provided as a reading system for the optical disk drive 114. A read demodulating unit 125 and a frequency synthesizer 126 are built in the read LSI circuit 124. A photosensing signal of the medium return light of the laser beam from a detector 132 for ID/MO is inputted as an ID signal and an MO signal to the read LSI circuit 124 through a head amplifier 134. Circuit functions of an AGC circuit, a filter, a sector mark detecting circuit, and the like are provided for the read demodulating unit 125 of the read LSI circuit 124. A read clock and read data are formed from the inputted ID signal and MO signal. The PWM recording data is demodulated to the original NRZ data. Since the zone CAV is used as a control system of a spindle motor 140, a setting control of a frequency dividing ratio to generate a clock frequency corresponding to the zone is performed from the MCU 112 to the frequency synthesizer 126 having the read LSI circuit 124 therein. The frequency synthesizer 126 is a PLL circuit having a programmable frequency divider and generates a reference clock having a predetermined peculiar frequency as a read clock in accordance with the zone position of the medium. The read data demodulated by the read LSI 124 is supplied to the magnetooptic disk controller 114. After completion of the inverse conversion of the 1-7 RLL code, the read data is subjected to the CRC check and the ECC process by an encoding function of the ECC processing unit 114-2. The NRZ sector data is reconstructed and coupled to the stream of the NRZ read data by the formatter 114-1. After that, the resultant data is transferred to the upper apparatus by the upper interface 117 via a buffer memory 118.

A detection signal of a temperature sensor 136 provided on the enclosure 111 side is supplied to the MCU 112 via the DSP 116. On the basis of an environmental temperature in the apparatus, each of the light emitting powers for reading, writing, and erasing in the laser diode control unit 122 is controlled to the optimum value. The MCU 112 controls the spindle motor 140 by a driver 138 through the DSP 116, thereby allowing the disk to rotate at a constant velocity of, for example, 6000 r.p.m. The MCU 112 supplies a current from the DSP 116 to an electromagnet provided on the enclosure 111 side through a driver 142, thereby applying a recording magnetic field to the medium. The DSP 116 has a servo function to position the beam from the laser diode unit 130 for the medium and executes a seek control for seeking the optical head to a target track so as to obtain an on-track state. The seek control can be simultaneously executed in parallel with the write access or read access in response to an upper command by the MCU 112. To realize the servo function of the DSP 116, a detector 145 for FES to receive the beam return light from the medium is provided for the optical unit on the enclosure 111 side. An FES detecting circuit (focusing error signal detecting circuit) 146 forms a focusing error signal E1 from a photosensing output of the detector 145 for FES and supplies it to the DSP 116. A detector 147 for TES to receive the beam return light from the medium is provided for the optical unit on the enclosure 111 side. A TES detecting circuit (tracking error signal detecting circuit) 148 forms a tracking error signal E2 from a photosensing output of the detector 147 for TES and supplies it to the DSP 116. The tracking error signal E2 is inputted to a TZC detecting circuit (track zero-cross point detecting circuit) 150, by which a track zero-cross pulse E3 is formed and inputted to the DSP 116. A lens position sensor 154 to detect the lens position of an objective lens for irradiating the laser beam to the medium is provided on the enclosure 111 side. A lens position detection signal (LPOS) E4 is inputted to the DSP 116. Further, to control the position of the beam spot on the medium, the DSP 116 controls a focusing actuator 160, a lens actuator 164, and a VCM 168 through drivers 158, 162, and 166, respectively.

Figure 15:
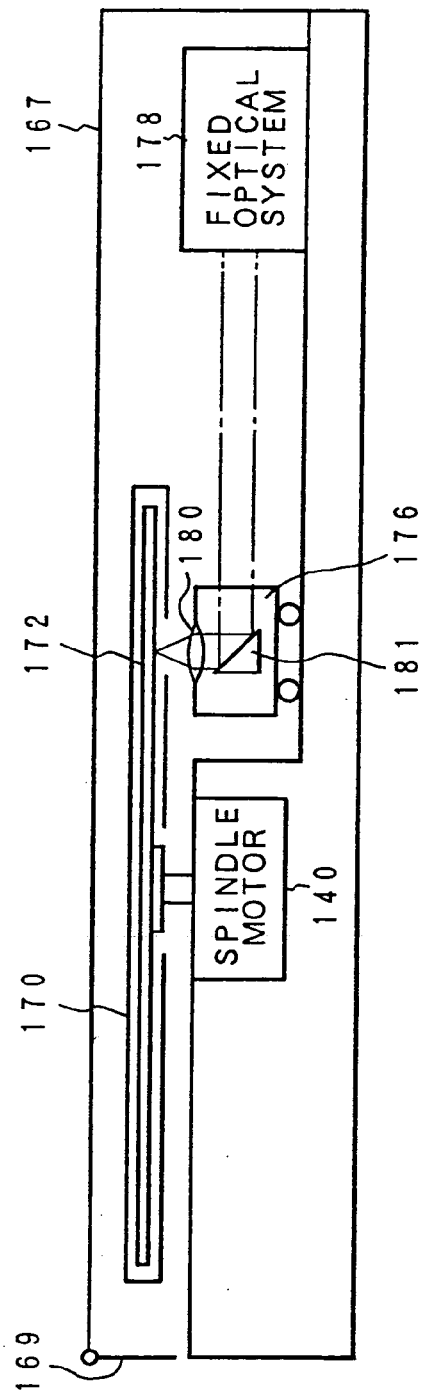
FIG. 15 is an explanatory diagram of an internal structure of an apparatus in which an MO cartridge has been loaded.

An outline of the enclosure 111 in the optical disk drive is as shown in FIG. 15. The spindle motor 140 is provided in a housing 167. A loading such that by inserting an MO cartridge 170 from an inlet door 169 side to a hub of a rotary shaft of the spindle motor 140, an internal MO medium 172 is attached to a hub of the rotary shaft of the spindle motor 140 is performed. A carriage 176 which is movable in the direction which traverses the medium tracks by the VCM 168 is provided under the MO medium 172 of the loaded MO cartridge 170. An objective lens 180 is mounted on the carriage 176. A beam from a laser diode provided for a fixed optical system 178 is inputted to the objective lens 180 through a prism 181, thereby forming a beam spot onto the medium surface of the MO medium 172. The objective lens 180 is moved in the optical axial direction by the focusing actuator 160 provided in the enclosure 111 in FIGS. 14A and 14B and can be moved in a range of, for example, tens of tracks in the radial direction which traverses the medium tracks by the lens actuator 164. It is also possible to construct such that the lens actuator 164 is not provided but the tracking control is performed by only the movement of the carriage 176 by the VCM 168.

Figure 16:
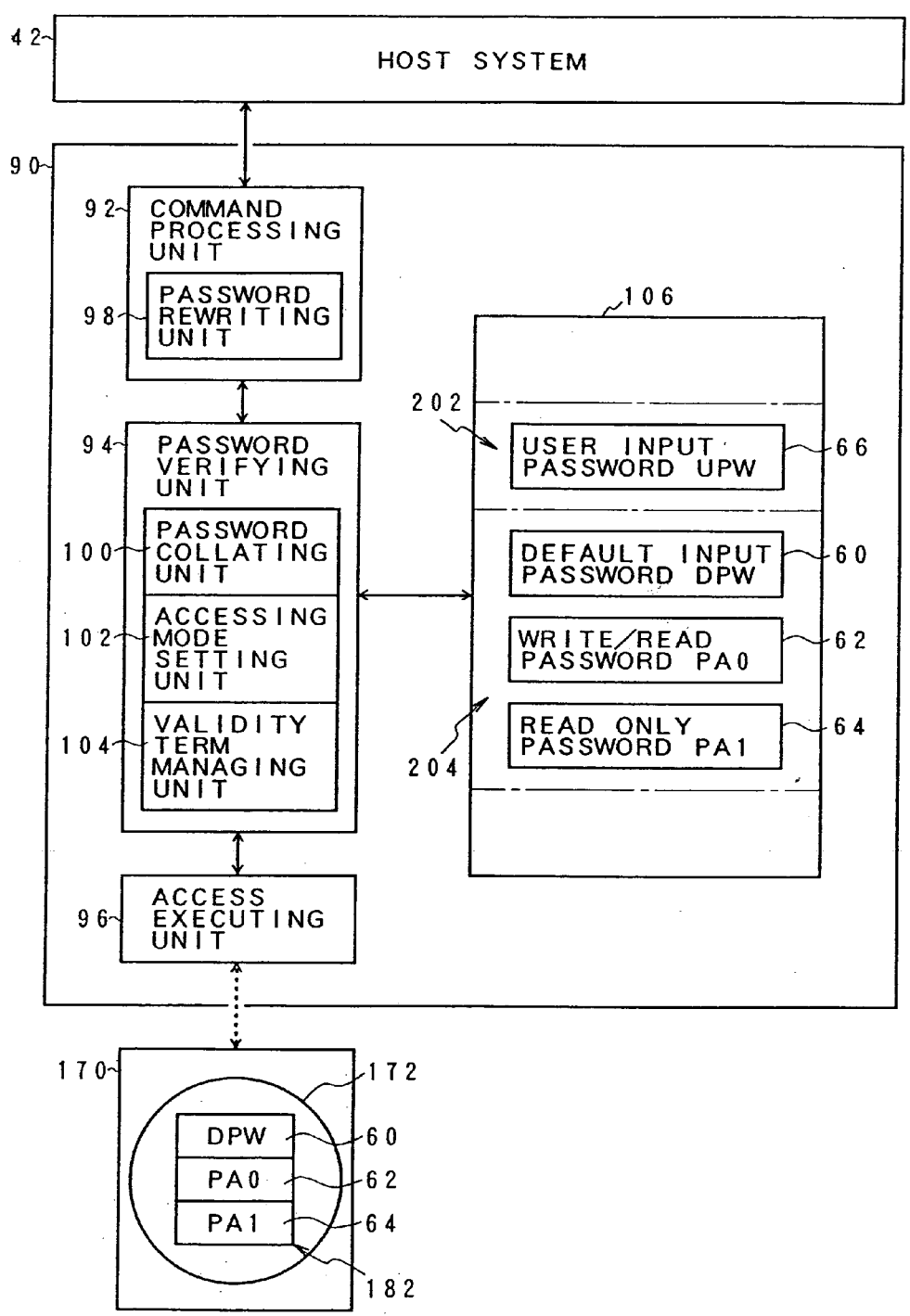
FIG. 16 is a functional block diagram of an embodiment of the invention in which a password has been preserved in only a removable medium.

FIG. 16 shows an embodiment of the access protection by using the default input password of the invention for the optical disk drive in FIGS. 14A and 14B as a target. The embodiment is characterized in that the default input password, write/read password, and read only password are preserved in the storage medium in accordance with the preserving mode 1 in FIG. 6. In FIG. 17, a password storing area 182 is provided in an area which cannot be read out by the ordinary command of the MO medium 172. The default input password 60, write/read password 62, and read only password 64 are stored in the password storing area 182. A user input password storing area 202 is provided in the work memory 106. The user input password 66 is stored in the user input password storing area 202. When the MO cartridge 170 is inserted into an optical disk drive 90, the default input password 60, write/read password 62, and read only password 64 are read out and stored into a password storing area 200 in the work memory 106 as shown in the diagram and are subjected to an access protecting process by a command processing unit 92, a password verifying unit 94, and an access executing unit 96. For the access protection using the default input password, the command processing unit 92, password verifying unit 94, and access executing unit 96 are provided for the optical disk drive 90. The password verifying unit 94 has a password collating unit 100 and an accessing mode setting unit 102. A password rewriting unit 98 is provided for the command processing unit 92. Such a construction on the driving side is fundamentally the same as that in the embodiment of FIG. 2 for, for example, the hard disk drive as a target. However, further, in the optical disk drive 90 using the MO cartridge 170 having the MO medium 172 as a removable medium, a validity term managing unit 104 is newly provided for the password verifying unit 94. The validity term managing unit 104 manages a term when the default input password 60 is validly used. If a validity term which has been preset in the MO medium 172 or optical disk drive 90 expired, the default input password 60 is forcedly rewritten to a different value. Consequently, in the validity term, even if the default input password 60 is the same as the write/read password 62, if the validity term expired, the default input password is changed to a value different from the write/read password 62, namely, a value corresponding to the EX-OR with a hexadecimal value "3F231200", so that the access of the optical disk drive 90 in which the password is not inputted is inhibited. On the contrary, when a predetermined period of time elapses, the default input password 60 is loaded so as to be rewritten in accordance with a certain rule. A value such that when the default input password is rewritten by this rule, it is equalized to, for example, the write/read password 62 serving as an access protection password is set as a rewrite value. With this method, the apparatus can be used by a method such that when the predetermined period of time elapses, the access can be performed without inputting any password.

FIG. 17 shows a processing operation of the access protection which does not need a password input of the user in the optical disk drive 90 in FIG. 16. The MO disk 172 has already been initialized at a time point when the apparatus is shipped out from the manufacturer of the medium. A hexadecimal value "CF23CF23h" as an initial value when the MO cartridge 170 is initialized has been stored in the default input password 60, write/read password 62, and read only password 64. Therefore, when the use of the optical disk drive is started in the preserving state of the initialized passwords, the default input password 60 is first read out and written into the user input password storing area 202 as a user input password 66 by a writing process 184. Subsequently, a collation comparing process 186 of the user input password 66 in which the default input password 60 has been written and the write/read password 62 is executed. When a collation coincidence is obtained, an access permission 188, namely, the writing/reading mode is set. Therefore, even in the optical disk drive 90 in FIG. 16, the user can establish an access permitting state of the MO cartridge 170 without needing the password input.

Figure 18:
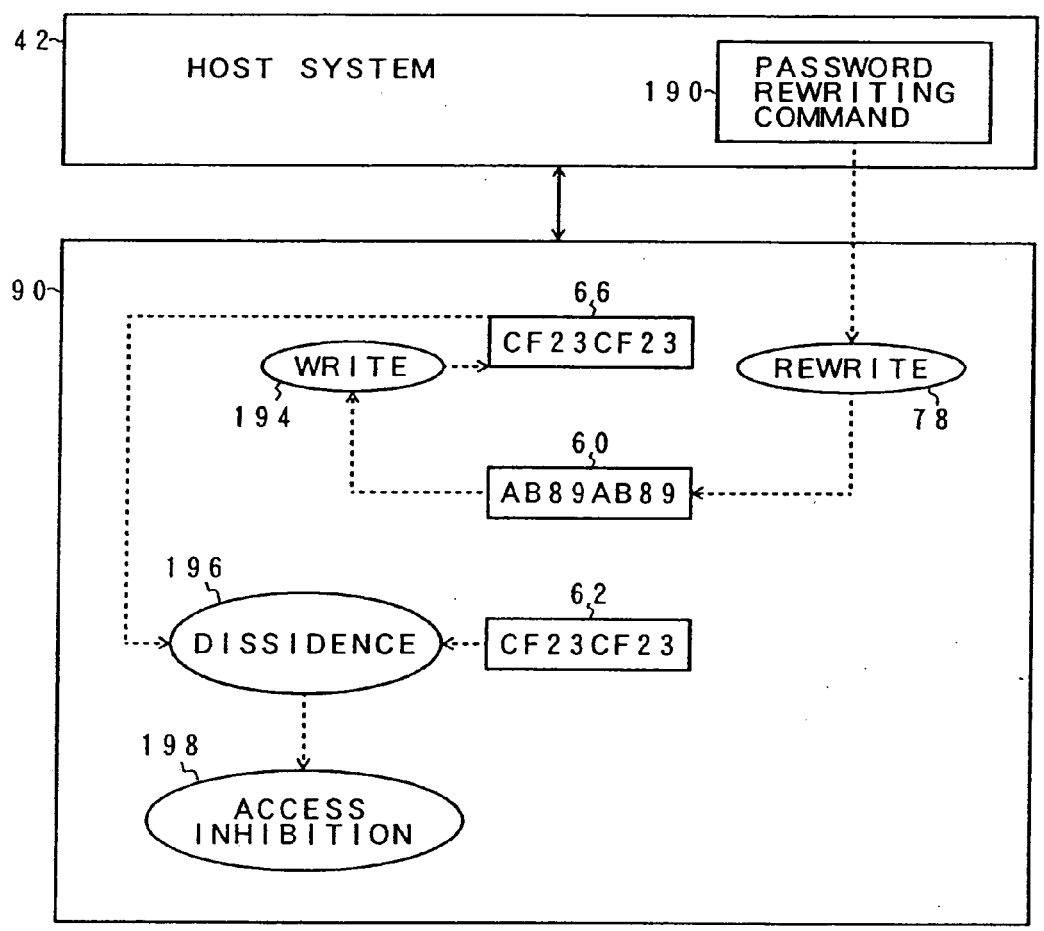
FIG. 18 is an explanatory diagram of a password rewriting process to inhibit an access by a default input password.

FIG. 18 shows a case where the password is rewritten in the state of the writing/reading mode in which the access permission based on the default input password has been established as shown in FIG. 17. In the password rewriting, the initial value "CF23CF23h" of the default input password 60 in FIG. 17 is rewritten to another value "AB89AB89h" by a rewriting process 192 based on a password rewriting command 190. If the default input password 60 is rewritten to another value as mentioned above, when the use of the optical disk drive 90 is started, unless the user inputs a password, the user input password 66 is first rewritten to a value "AB89AB89h" of the default input password 60 after the change by a writing process 194. Subsequently, a collation comparing process 196 between this value and the value "CF23CF23h" of the write/read password 62 is executed. In this case, since a collation dissidence is obtained, an access inhibition 198, namely, the security mode is set.

Figure 19:
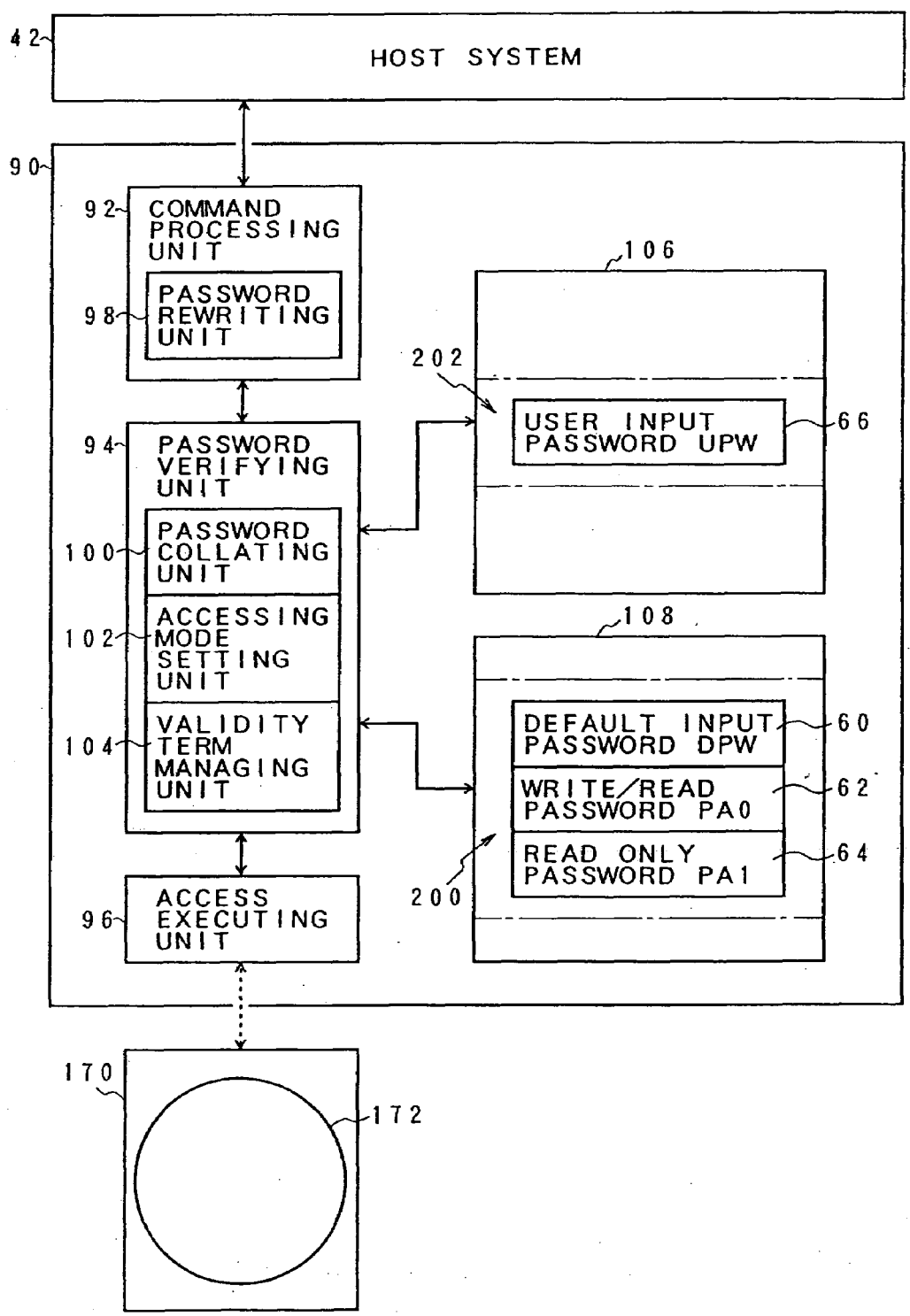
FIG. 19 is a functional block diagram of an embodiment of the invention in which a password has been preserved in an MO drive main body.

The rewriting of the default input password 60 as shown in FIG. 19 is effective in the following case. First, the authorized inherent user Mr. A of the optical disk drive 90 requests a secretary Mr. B to perform a process in a state where the default input password 60 and write/read password 62 are set to the same initial value "CF23CF23h" as shown in FIG. 17. Mr. B who received the request turns on the power source, so that the reading/writing mode by the access permission based on the default input password 60 is established even if he does not know the password. He can execute the process using the optical disk drive 90. The inherent user Mr. A preliminarily requests Mr. B, whom Mr. A requested the work, to input a password rewriting command (Change Default Psw "AB89AB89") if he finished the work. Mr. B who received the request inputs the command instructed from Mr. A if the work was finished. When the command is inputted, the default input password 60 is rewritten to "AB89AB89h" as shown in FIG. 18. Therefore, Mr. B who received the request from the inherent user Mr. A and performed the work finishes the work, rewrites the default input password 60, and executes an ejecting operation of the MO cartridge 170. Thus, in response to an instruction in association with the ejecting operation, the default input password 60, write/read password 62, and read only password 64 developed in the work memory 106 are written back to the password storing area 182 of the MO cartridge 170. After that, the MO cartridge 170 is ejected. Therefore, after the MO cartridge 170 was ejected, even if the MO cartridge 170 is again inserted into the optical disk drive 90, the default input password 60 which is read out and stored into the work memory 106 at this time is changed to a value different from the write/read password 62 as shown in FIG. 18. Unless the value of the write/read password 60 is inputted as a password, the access to the MO cartridge 170 can be perfectly inhibited. That is, the inherent user Mr. A instructs Mr. B to input a default input password rewriting command after the end of the work, thereby constructing in a manner such that after Mr. B finished the work, even if Mr. B as well as the third person turns on the power source in order to use the optical disk drive 90 of Mr. A, unless he inputs the password "CF23CF23h" which is known for only the inherent user Mr. A, the optical disk drive 90 enters the security mode and the access can be completely inhibited.

FIG. 19 shows an embodiment of the optical disk drive 90 corresponding to the preserving mode 1 in FIG. 6. This embodiment is characterized in that the default input password, write/read password, and read only password are preserved on the drive main body side. The password storing area 200 is provided in the non-volatile memory 108 of the optical disk drive 90. The default input password 60, write/read password 62, and read only password 64 are stored in the password storing area 200. The user input password storing area 202 is provided in the work memory 106. The user input password 66 is stored in the user input password storing area 202. For the purpose of the access protection using the default input password, the command processing unit 92, password verifying unit 94, and access executing unit 96 are provided for the optical disk drive 90. The password verifying unit 94 has the password collating unit 100 and accessing mode setting unit 102. The password rewriting unit 98 is provided for the command processing unit 92. Further, the validity term managing unit 104 is newly provided for the password verifying unit 94.

Figure 20:
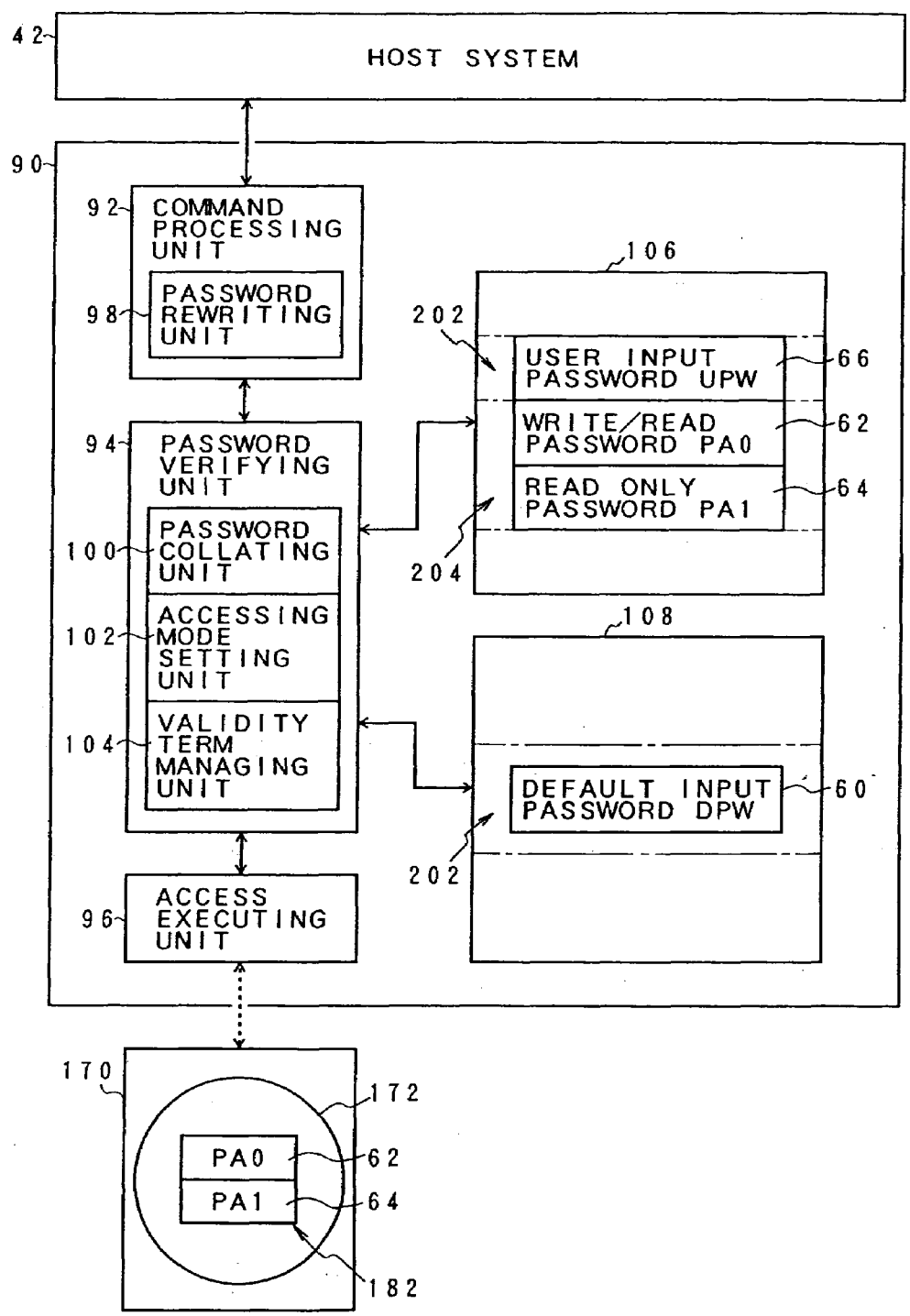
FIG. 20 is a functional block diagram of an embodiment of the invention in which a password has been separately preserved in the MO drive main body and a removable medium.

FIG. 20 shows an embodiment of the optical disk drive 90 corresponding to the preserving mode 3 in FIG. 6. This embodiment is characterized in that the default input password 60 is preserved in the password storing area 200 in the non-volatile memory 108 of the optical disk drive 90 and the write/read password 62 and read only password 64 are preserved in the password storing area 182 of the MO cartridge 170 as a removable medium. Therefore, when the MO cartridge 170 is inserted into the optical disk drive 90, the password verifying unit 94 first reads out the write/read password 62 and read only password 64 from the password storing area 182 of the MO cartridge 170 through the access executing unit 96 and develops them into the work memory 106.

Figure 21:
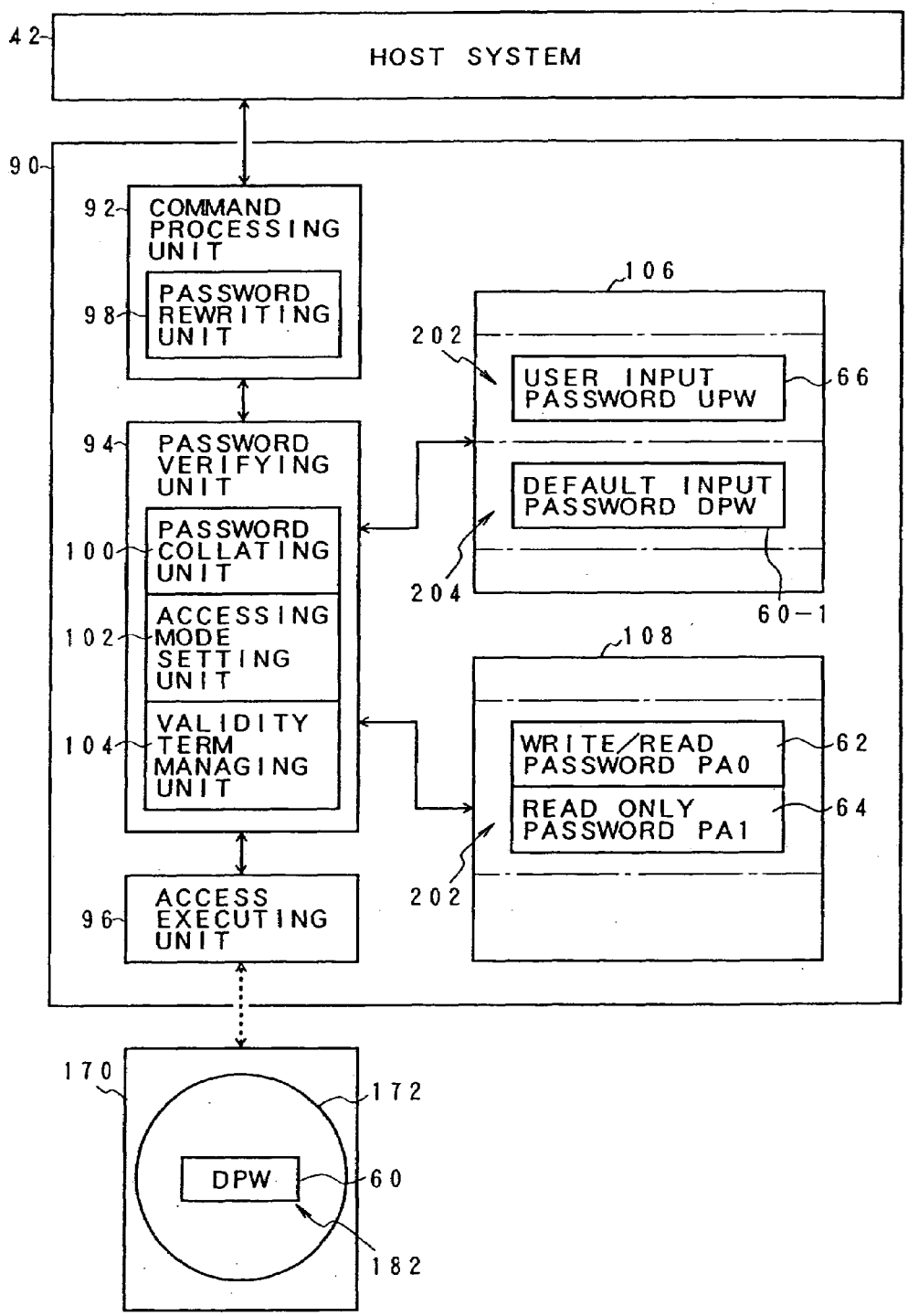
FIG. 21 is a functional block diagram of another embodiment of the invention in which a password has been separately preserved in the MO drive main body and the removable medium.

FIG. 21 shows an embodiment of the optical disk drive 90 to which the preserving mode 4 in FIG. 6 is applied. In the preserving mode 4, the write/read password 62 for access protection and the read only password 64 are preserved in the password storing area 200 in the non-volatile memory 108 of the optical disk drive 90. The default input password 60 is preserved in the password storing area 182 of the MO cartridge 170. Therefore, when the MO cartridge 170 is inserted into the optical disk drive 90, the password verifying unit 94 reads out the default input password 60 from the MO cartridge 170 through the access executing unit 96 and develops it into a password storing area 204 in the work memory 106 as shown in the diagram.

Figure 22:
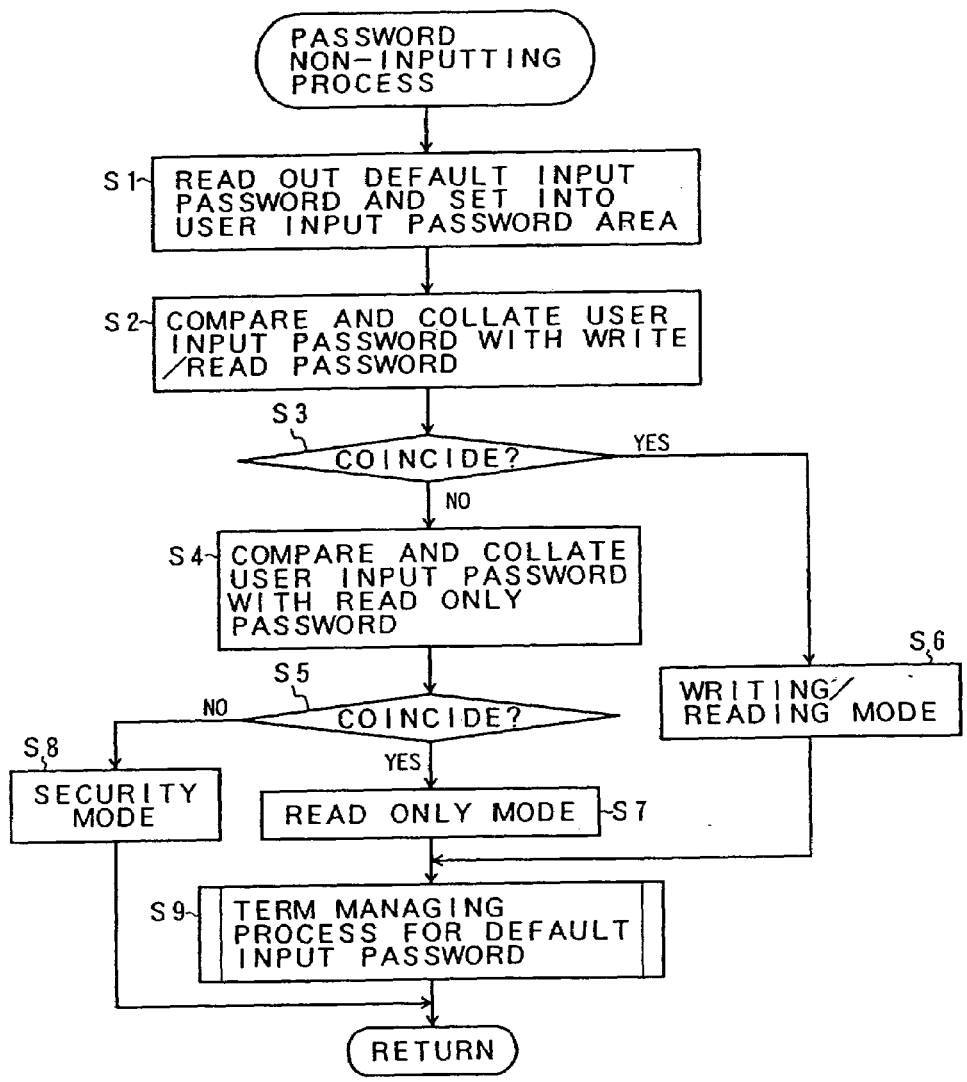
FIG. 22 is a flowchart for an access protecting process in the case where there is no password input by the user in the MO drive.

FIG. 22 is a flowchart for the access protecting process in the case where the user does not input a password in the optical disk drive 90. A case of the preserving mode 2 in FIG. 6 will now be described as an example. When the MO cartridge 170 is inserted into the optical disk drive 90, in step S1, the default input password 60 is read out and written and set as a user input password 66 into the user input password area. In step S2, the user input password 66 and write/read password 62 are compared and collated. When the collation coincidence is obtained in step S3, the writing/reading mode is set in step S6. When the collation dissidence is obtained, the user input password 66 and read only password 64 are compared and collated in step S4. When the collation coincidence is obtained in step S5, the read only mode is set in step S7. When the collation dissidence is obtained, the security mode is set in step S8 and the access which is not accompanied with the password is perfectly inhibited. When the writing/reading mode or reading mode is set in step S6 or S7, a term managing process by the validity term managing unit 104 provided in the password verifying unit 94 is executed in step S9.

Figure 23:
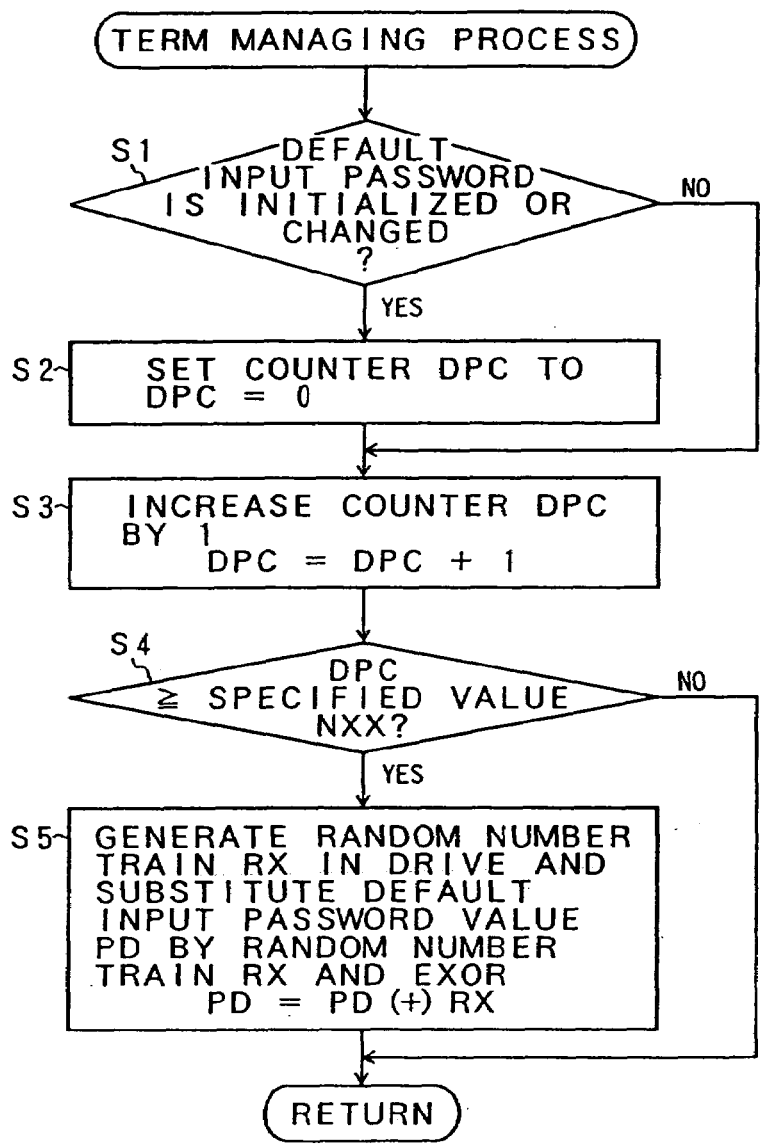
FIG. 23 is a flowchart for a validity term managing process in FIG. 21 for counting the number of using times by a counter and managing a term of a default input password.

FIG. 23 is a flowchart for an embodiment of the term managing process in step S9 in FIG. 22. In the term managing process, first in step S1, the presence or absence of the initialization of the default input password or the change by the command is discriminated. When there is the initialization or change, the counter DPC is set to DPC=0 in step S2. In step S3, a count value of the counter DPC is increased by "1". If there is not the initialization or change of the default input password, step S2 is skipped and the count value of the counter DPC is increased by "1" in step S3. In step S4, a check is made to see whether the count value of the counter DPC is equal to or larger than a specified value NXX which gives a predetermined validity term or not. When the value of the counter DPC is less than the specified value NXX, step S5 is skipped. However, when the value of the counter DPC is equal to or larger than the specified value NXX, step S5 follows and a random number train RX is generated in the optical disk drive 90. The exclusive OR between the value PD of the default input password and the random number train RX is obtained and is set to a value of the new default input password. That is, in the embodiment, the number of using times of the optical disk drive 90 is counted by the counter DPC. When the number of using times reaches the specified value NXX, the default input password is forcedly changed to a value which cannot be known by the user by using the random number train, thereby inhibiting the access permission in which the password is not inputted after the validity term.

Figure 24:
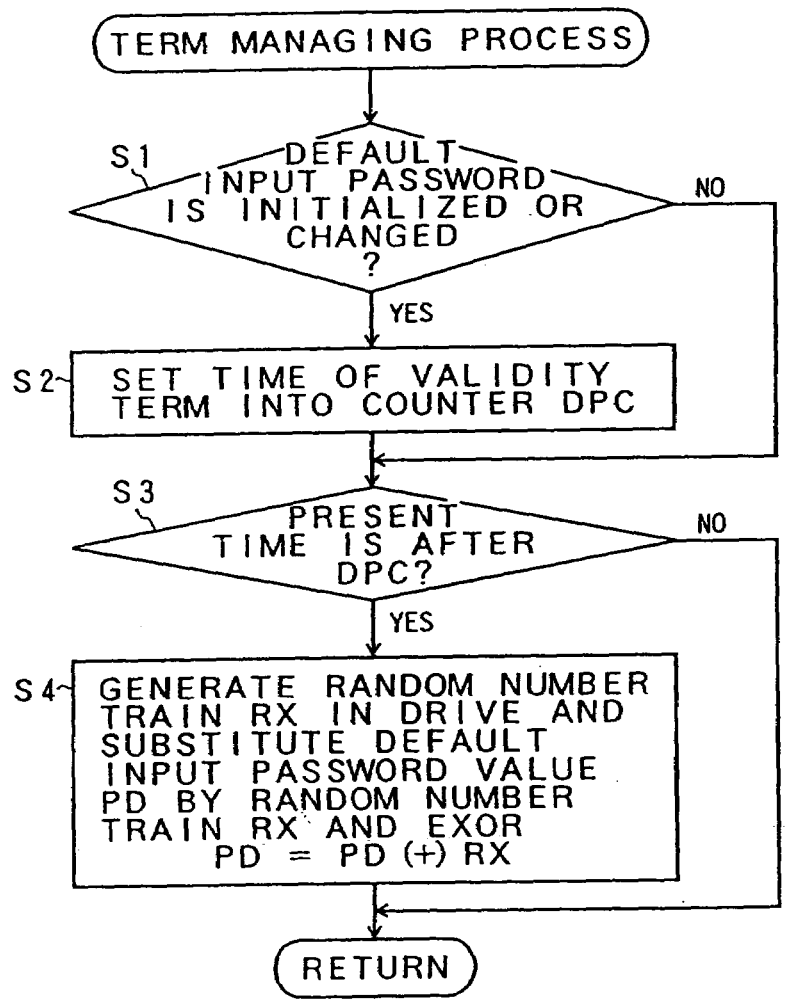
FIG. 24 is a flowchart for the validity term managing process in FIG. 21 for setting and managing a time serving as a term of the default input password.

FIG. 24 is a flowchart for another embodiment of the term managing process of the default input password in step S9 in FIG. 22. In the term managing process, in step S1, the presence or absence of the initialization or change of the default input password is discriminated. If there is the initialization or change, the time of a predetermined validity term is set into the counter DPC in step S2. In step S3, a check is made to see if the present time is a time after the validity term set in the counter DPC. When the present time is the time after the time of the validity term of the counter DPC, step S4 follows. In a manner similar to the case of FIG. 23, the random number train RX is generated in the optical disk drive 90 and is replaced by the exclusive OR between the random number train RX and the value PD of the default input password in this instance. The value of the default input password is forcedly changed to a different value and the access of the optical disk drive 90 irrespective of the password input after the validity term is perfectly inhibited. It is possible to set a using method such that when the present time is the time after the validity term of the counter DPC and the processing routine advances to step S5, the default input password 60 is changed to an access protection password, for example, the value which is equal to the write/read password 62, thereby making it possible to access even if the password is not inputted after the elapse of a predetermined period of time. In the optical disk drive 90, the process in the case where the user does not input the password in the flowchart of FIG. 22 has been shown as an example. However, the processes in the case where the user inputs the password are the same as those in the flowchart of FIG. 12 in the hard disk drive. The processes in the flowchart of FIG. 13 of the hard disk drive in which the user is allowed to certainly execute the password inputting operation can be also applied as they are to the optical disk drive 90.

As mentioned above, according to the invention, the default input password is stored on the apparatus side where it is protected by using the password, for example, on the storing apparatus side, and when there is no password input from the user, the default input password is regarded as a user input password and the verification of the password is performed. Therefore, by setting the default input password and the password for access protection to the same value, even if the user does not input any password, the access protection is cancelled and the access by the ordinary command can be performed. The password input by the user can be remarkably omitted.

In the case where the access has already been permitted in the storing apparatus, by enabling the default input password to be rewritten by the user, the user can selectively use the access protection which does not need the password input and the access protection which needs the password input as necessary.

Further, the validity term of the default input password is managed and, when the present time exceeds the validity term, the default input password is forcedly changed to another value which cannot be known by the user. Thus, the accessible state of the storing apparatus in which the password input is omitted can be limitedly continued for only a predetermined period of time. A situation such that a defenseless state where the password input can be omitted continues for a long period of time can be prevented.

Although the above embodiment has been described with respect to the case where, for instance, the hard disk drive and optical disk drive are used as storing apparatuses, the invention obviously also incorporates other storing apparatuses such as magnetic tape drive and floppy disk drive. The invention is not limited to the storing apparatus but can be also applied as it is to an apparatus or a general system for performing the access protection by the password.

The invention incorporates other arbitrary modifications within a scope without losing the objects and advantages of the invention. Further, the invention is not limited by the numerical values shown in the embodiment.

What is claimed is:

1. A storing apparatus for use with a computer-based system in which a first user can selectively protect access to information recorded on a medium with a second password, or permit access to the information without inputting the second password, said apparatus comprising:

a password preserving unit for preserving a first password for selecting protect access or permit access to information recorded on the medium, and the second password for access protection; and a password verifying unit which, when an access authorization is requested by entering a password, compares the entered password with the second password; if in agreement, issues an authorization, and if not, refuses to issue an authorization; and when an access authorization is requested without entering a password, compares the first password and the second password; if in agreement, issues an authorization, and if not, refuses to issue an authorization;

wherein in the case where a same value has been preserved in said first password and said second password, said password verifying unit copies a value of said first password to the user input password and collates the same with said second password, thereby permitting an access.

2. A storing apparatus for use with a computer-based system in which a first user can selectively protect access to information recorded on a medium with a second password, or permit access to the information without inputting the second password, said apparatus comprising:

a password preserving unit for preserving a first password for selecting protect access or permit access to information recorded on the medium, and the second password for access protection; and a password verifying unit which, when an access authorization is requested by entering a password, compares the entered password with the second password; if in agreement, issues an authorization, and if not, refuses to issue an authorization;

and when an access authorization is requested without entering a password, compares the first password and the second password; if in agreement, issues an authorization, and if not, refuses to issue an authorization, wherein said password preserving unit further has a user input password area to store a user input password input by a user, and said password verifying unit is constructed in a manner such that at the start of the use of the apparatus such as turn-on of a power source, command reset, error reset, medium insertion, or the like, said first password is read out and written into said user input password area, an access permission is established if the first password is the same as the second password, or an access inhibition is established if the first password is not the same as the second password, on the basis of a collation between the first password in said user input password area and the second password for access protection, and after said access permission or inhibition is established, each time there is a password input of the user, the user input password is written into said user input password area and, subsequently, the access permission inhibition is established on the basis of a collation between the user input password in said user input password area and the second password for access protection.

3. A storing apparatus for use with a computer-based system in which a first user can selectively protect access to information recorded on a medium with a second password, or permit access to the information without inputting the second password, said apparatus comprising:

a password preserving unit for preserving a first password for selecting protect access or permit access to information recorded on the medium, and the second password; and a password verifying unit which, when an access authorization is requested by entering a password, compares the entered password with the second password; if in agreement, issues an authorization, and if not, refuses to issue an authorization;

and when an access authorization is requested without entering a password, compares the first password and the second password; if in agreement, issues an authorization, and if not, refuses to issue an authorization, wherein said password preserving unit further has a user input password area to store a user input password input by a user, and said password verifying unit is constructed in a manner such that at the start of the use of the apparatus such as turn-on of a power source, command reset, error reset, medium insertion, or the like, the apparatus waits for the password input by the user in a state where said first password is read out and written into said user input password area, when there is the user password input, the user input password is overwritten into the first password in said user input password area, and after that, the password in said user input password area and said second password for access protection are compared and the access protection is controlled, and when there is no user password input and/or in the case where the password is an empty character train even if there is the user password input, the comparison between the first password in said user input password area and the second password for access protection is executed and the access protection is controlled.

4. A storing apparatus for use with a computer-based system in which a first user can selectively protect access to information recorded on a medium with a second password, or permit access to the information without inputting the second password, said apparatus comprising:

a password preserving unit for preserving a first password for selecting protect access or permit access to information recorded on the medium, and the second password for access protection; and a password verifying unit which, when an access authorization is requested by entering a password, compares the entered password with the second password; if in agreement, issues an authorization, and if not, refuses to issue an authorization; and when an access authorization is requested without entering a password, compares the first password and the second password; if in agreement, issues an authorization, and if not, refuses to issue an authorization, wherein said password preserving unit preserves said first password and said second password for access protection into said medium, and said password verifying unit reads out said first password and said second password for access protection from said medium and stores into an apparatus main body at the start of the use of the apparatus and controls the access protection.

5. A storing apparatus for use with a computer-based system in which a first user can selectively protect access to information recorded on a medium with a second password, or permit access to the information without inputting the second password, said apparatus comprising:

a password preserving unit for preserving a first password for selecting protect access or permit access to information recorded on the medium, and the second password for access protection; and a password verifying unit which, when an access authorization is requested by entering a password, compares the entered password with the second password; if in agreement, issues an authorization, and if not, refuses to issue an authorization; and when an access authorization is requested without entering a password, compares the first password and the second password; if in agreement, issues an authorization, and if not, refuses to issue an authorization, wherein said password preserving unit preserves said first password into a non-volatile memory of an apparatus main body and preserves said second password for access protection into the medium, and said password verifying unit reads out said second password for access protection from said medium and stores into the apparatus main body at the start of the use of the apparatus and controls the access protection.

6. A storing apparatus for use with a computer-based system in which a first user can selectively protect access to information recorded on a medium with a second password, or permit access to the information without inputting the second password, said apparatus comprising:

a password preserving unit for preserving a first password for selecting protect access or permit access to information recorded on the medium, and the second password for access protection; and a password verifying unit which, when an access authorization is requested by entering a password, compares the entered password with the second password; if in agreement, issues an authorization, and if not, refuses to issue an authorization; and when an access authorization is requested without entering a password, compares the first password and the second password; if in agreement, issues an authorization, and if not, refuses to issue an authorization, wherein said password preserving unit preserves said second password for access protection into a non-volatile memory of an apparatus main body and preserves said first password into the medium, and said password verifying unit reads out said first password from said medium and stores into the apparatus main body at the start of the use of the apparatus and controls the access protection.

7. An apparatus according to claim 1, wherein in said medium, a password preserving area to preserve said second password is provided in a specific area which cannot be accessed by an ordinary read command and write command.

8. A storing apparatus for use with a computer-based system in which a first user can selectively protect access to information recorded on a medium with a second password, or permit access to the information without inputting the second password, said apparatus comprising:

a password preserving unit for preserving a first password for selecting protect access or permit access to information recorded on the medium, and the second password for access protection; and a password verifying unit which, when an access authorization is requested by entering a password, compares the entered password with the second password; if in agreement, issues an authorization, and if not, refuses to issue an authorization; and when an access authorization is requested without entering a password, compares the first password and the second password; if in agreement, issues an authorization, and if not, refuses to issue an authorization the storing apparatus further comprising, a password rewriting unit for rewriting said default input password or said first password for access protection on the basis of a dedicated command from an upper apparatus.

9. An apparatus according to claim 1, wherein said medium is fixedly enclosed in the apparatus main body.

10. An apparatus according to claim 1, wherein said medium is detachable from the apparatus main body.

11. A storing apparatus for use with a computer-based system in which a first user can selectively protect access to information recorded on a medium with a second password, or permit access to the information without the second password, said apparatus comprising:

a password preserving unit for preserving a first password for selecting protect access or permit access to information recorded on the medium, and the second password for access protection; and a password verifying unit which, when an access authorization is requested by entering a password, compares the entered password with the second password; if in agreement, issues an authorization, and if not, refuses to issue an authorization; and when an access authorization is requested without entering a password, compares the first password and the second password; if in agreement, issues an authorization, and if not, refuses to issue an authorization, wherein said password preserving unit preserves a plurality of kinds of passwords for access protection according to kinds of access protection, and said password verifying unit permits an access by an ordinary command corresponding to the kind of said first password for access protection in which a collation coincidence is obtained.

12. An apparatus according to claim 11, wherein as said first passwords for access protection, said password preserving unit preserves a write/read password to permit an access by a read command and a write command and a read only password to permit only an access by the read command, and said password verifying unit permits the access by the ordinary write command or read command when the collation coincidence of said write/read password is obtained and permits the access by only the ordinary read command when the collation coincidence of said read only password is obtained.

13. A storing apparatus for use with a computer-based system in which a first user can selectively protect access to information recorded on a medium with a second password, or permit access to the information without the second password, said apparatus comprising:

a password preserving unit for preserving a first password for selecting protect access or permit access to information recorded on the medium, and the second password for access protection; and a password verifying unit which, when an access authorization is requested by entering a password, compares the entered password with the second password; if in agreement, issues an authorization, and if not, refuses to issue an authorization; and when an access authorization is requested without entering a password, compares the first password and the second password; if in agreement, issues an authorization, and if not, refuses to issue an authorization, the storing apparatus further comprising a validity term setting unit for setting a validity term into said first password.

14. An apparatus according to claim 13, wherein said validity term setting unit counts the number of using times of the apparatus by a counter and, when a value of said counter reaches a predetermined value, said validity term setting unit changes said first password to a different value.

15. An apparatus according to claim 13, wherein said validity term setting unit sets a time of a validity term and, when a present time in case of using the apparatus exceeds said validity term, said validity term setting unit changes said first password to a different value.

16. A method of selectively protecting access to information recorded on a medium with a second password for use with a computer-based system, or permitting access to the information without inputting the second password, comprising:

a password preserving step of preserving the second password and a first password for selecting protect access or permit access to information recorded on the medium; and a password verifying step which, when an access authorization is requested by entering a password, compares the entered password with the second password; if in agreement, issues an authorization, and if not, refuses to issue an authorization; and when an access authorization is requested without entering a password, compares the first password and the second password; if in agreement, issues an authorization, and if not, refuses to issue an authorization;

wherein in the case where a same value has been preserved in said first password and said second password, in said password verifying step, a value of said first password is copied to the user input password and is collated with said second password, thereby permitting an access.

17. A method of selectively protecting access to information recorded on a medium with a second password for use with a computer-based system, or permitting access to the information without inputting the second password, comprising:

a password preserving step of preserving the second password and a first password for selecting protect access or permit access to information recorded on the medium; and a password verifying step which, when an access authorization is requested by entering a password, compares the entered password with the second password; if in agreement, issues an authorization, and if not, refuses to issue an authorization;

and when an access authorization is requested without entering a password, compares the first password and the second password; if in agreement, issues an authorization, and if not, refuses to issue an authorization, wherein in said password preserving step, a plurality of kinds of passwords for access protection according to kinds of said access protection are preserved, and in said password verifying step, an access by an ordinary command corresponding to the kind of said first password for access protection in which a collation coincidence is obtained is permitted.

18. A method of selectively protecting access to information recorded on a medium with a second password for use with a computer-based system, or permitting access to the information without inputting the second password, comprising:

a password preserving step of preserving the second password and a first password for selecting protect access or permit access to information recorded on the medium; and a password verifying step which, when an access authorization is requested by entering a password, compares the entered password with the second password; if in agreement, issues an authorization, and if not, refuses to issue an authorization; and when an access authorization is requested without entering a password, compares the first password and the second password; if in agreement, issues an authorization, and if not, refuses to issue an authorization, the method further comprising a validity term setting step of setting a validity term into said first password.

* * * * *